(12) United States Patent
Takasuka et al.

(10) Patent No.: US 11,371,880 B2
(45) Date of Patent: Jun. 28, 2022

(54) ROAD SURFACE CONDITION DETERMINATION DEVICE

(71) Applicant: DENSO CORPORATION, Kariya (JP)

(72) Inventors: Naohito Takasuka, Nisshin (JP); Yoichiro Suzuki, Nisshin (JP); Takatoshi Sekizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 168 days.

(21) Appl. No.: 16/936,159

(22) Filed: Jul. 22, 2020

(65) Prior Publication Data

US 2020/0348167 A1 Nov. 5, 2020

Related U.S. Application Data

(63) Continuation of application No. PCT/JP2019/003431, filed on Jan. 31, 2019.

(30) Foreign Application Priority Data

Feb. 1, 2018 (JP) .............................. JP2018-016624

(51) Int. Cl.
*G01H 11/06* (2006.01)
*B60C 19/00* (2006.01)
(Continued)

(52) U.S. Cl.
CPC .............. *G01H 11/06* (2013.01); *B60C 19/00* (2013.01); *G01B 15/00* (2013.01); *G01D 5/48* (2013.01);
(Continued)

(58) Field of Classification Search
None
See application file for complete search history.

(56) References Cited

U.S. PATENT DOCUMENTS 10,378,159 B2 * 8/2019 Svantesson .............. G01C 7/04
10,726,714 B2 * 7/2020 Sekizawa .............. B60C 23/064
(Continued)

FOREIGN PATENT DOCUMENTS

JP 2009248783 A 10/2009

*Primary Examiner* — Peter J Macchiarolo
*Assistant Examiner* — Jermaine L Jenkins
(74) *Attorney, Agent, or Firm* — Harness, Dickey & Pierce, P.L.C.

(57) ABSTRACT

A vehicle body side system is provided with a second data communication unit that performs bidirectional communication with a tire side device and receives road surface data and measurement data transmitted from a first data communication unit, a road surface determination unit that determines the road surface condition of a road surface on which a vehicle travels based on the road surface data, a reception strength measurement unit that measures the reception strength of the measurement data, and a transmission angle setting unit that stores the reception strength of the measurement data during one rotation of a tire, sets as a transmission angle, a presence angle when the reception strength of the measurement data during one rotation of the tire is high, and transmits data indicating the transmission angle to the tire side device via the second data communication unit. In addition, a control unit causes the first data communication unit to transmit the road surface data when the presence angle becomes the transmission angle.

19 Claims, 16 Drawing Sheets

(51) Int. Cl.
*G01B 15/00* (2006.01)
*G01D 5/48* (2006.01)
*G01P 3/50* (2006.01)
*G01P 15/00* (2006.01)

(52) U.S. Cl.
CPC ............... *G01P 3/50* (2013.01); *G01P 15/00* (2013.01); *B60C 2019/004* (2013.01)

(56) References Cited

U.S. PATENT DOCUMENTS

| | | | | |
|---|---|---|---|---|
| 2015/0191056 A1* | 7/2015 | Mori | ................... | B60C 23/0488 73/382 R |
| 2019/0143987 A1* | 5/2019 | Sekizawa | ............... | G01K 13/00 73/146 |

\* cited by examiner

ROAD SURFACE CONDITION DETERMINATION DEVICE

CROSS REFERENCE TO RELATED APPLICATION

This application is a continuation application of PCT/JP2019/003431 filed on Jan. 31, 2019 based on Japanese Patent Application No. 2018-016624 filed on Feb. 1, 2018. The whole disclosures of both of the above applications are incorporated herein by reference.

FIELD

The present disclosure relates to a road surface state determination device which detects by a tire side device vibration received by each tire, generates road surface data representing a road surface condition based on vibration data, transmits the road surface data to a vehicle body side system, and determines the road surface condition based on the road surface data.

BACKGROUND

Conventionally, there is proposed a road surface condition determination device that includes an acceleration sensor on a back surface of a tire tread, detects vibration applied to the tire by the acceleration sensor, and determines the road surface condition based on a detection result of the vibration. This road surface state determination device determines the road surface condition by generating data representing a road surface condition based on a vibration waveform of the tire detected by the acceleration sensor and transmitting the data of each road wheel to a vehicle body side receiver and the like.

In the road surface condition determination device, data communication is performed from the tire side device including the acceleration sensor or the like provided on the tire side to a vehicle body side system such as a receiver provided on the vehicle body. Therefore, it is preferable that data transmission from the tire side device is performed when the angle at which the tire side device is positioned with respect to the center of the tire is a desirable angle for data communication.

For example, in one conventional tire pressure monitoring device having a pressure sensor or the like provided on a tire side and a receiver provided on a vehicle body side, data transmission is performed when the pressure sensor is rotated to a predetermined angle with respect to the center of the tire in one rotation of the tire. This device measures the angle of the pressure sensor at a timing when the tire pressure reaches a peak value in one rotation of the tire, and measures a time period from the timing of the peak value to a pre-measured timing at which the pressure sensor is rotated to an angle at which data communication becomes good. Then, air pressure data is transmitted after a fixed time period from the timing of the peak value of the tire air pressure so that the data communication is performed satisfactorily.

SUMMARY

According to the present disclosure, a road surface condition determination device comprises a tire side device attached to each tire of a vehicle, and a vehicle body side system provided in a vehicle body.

The tire side device includes a vibration detection unit configured to output a detection signal varying with a magnitude of vibration of the tire, a first control unit configured to generate road surface data indicating a road surface condition appearing in a waveform of the detection signal and measurement data for use in measuring a reception strength by the vehicle body side system, estimate an existence angle indicating a position of the tire sided device relative to a predetermined position of the tire based on the waveform of the detection signal, and cause a transmission of the road surface data at a transmission timing determined based on the existence angle, and a first data communication unit configured to transmitting the road surface data or the measurement data.

The vehicle body side system includes a second data communication unit configured to receive, by bilateral communication with the tire side device, the road surface data and the measurement data transmitted from the first data communication unit, and a second control unit configured to determine a road surface condition of a traveling road surface of the vehicle based on the road surface data, measure a reception strength of the measurement data, store a reception strength of the measurement data in one rotation of the tire, and set a transmission angle to the existence angle at which a reception strength of the measurement data is higher than a predetermined value in one rotation of the tire.

DETAILED DESCRIPTION OF THE EMBODIMENT

Figure 1:
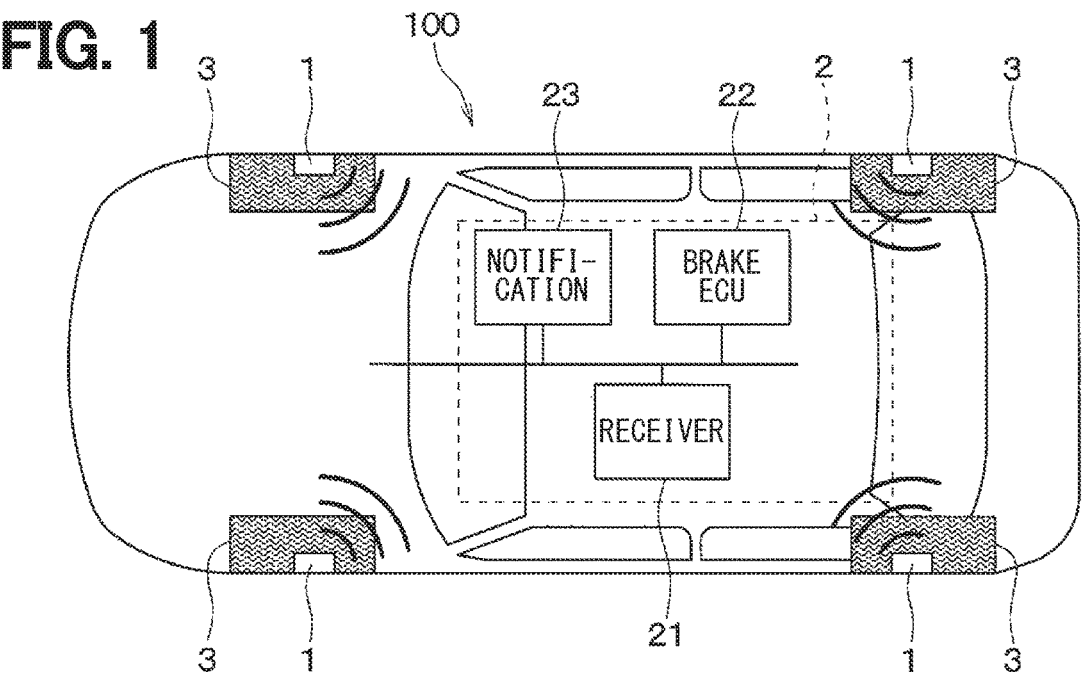
FIG. 1 is a schematic view showing a block configuration of a tire system, which includes a road surface condition determination device and mounted in a vehicle according to a first embodiment.

Hereinafter, embodiments of the present disclosure will be described in detail with reference to the drawings. In each embodiment described below, same or equivalent parts are designated with the same reference numerals thereby simplifying the description.

First Embodiment

Figure 2:
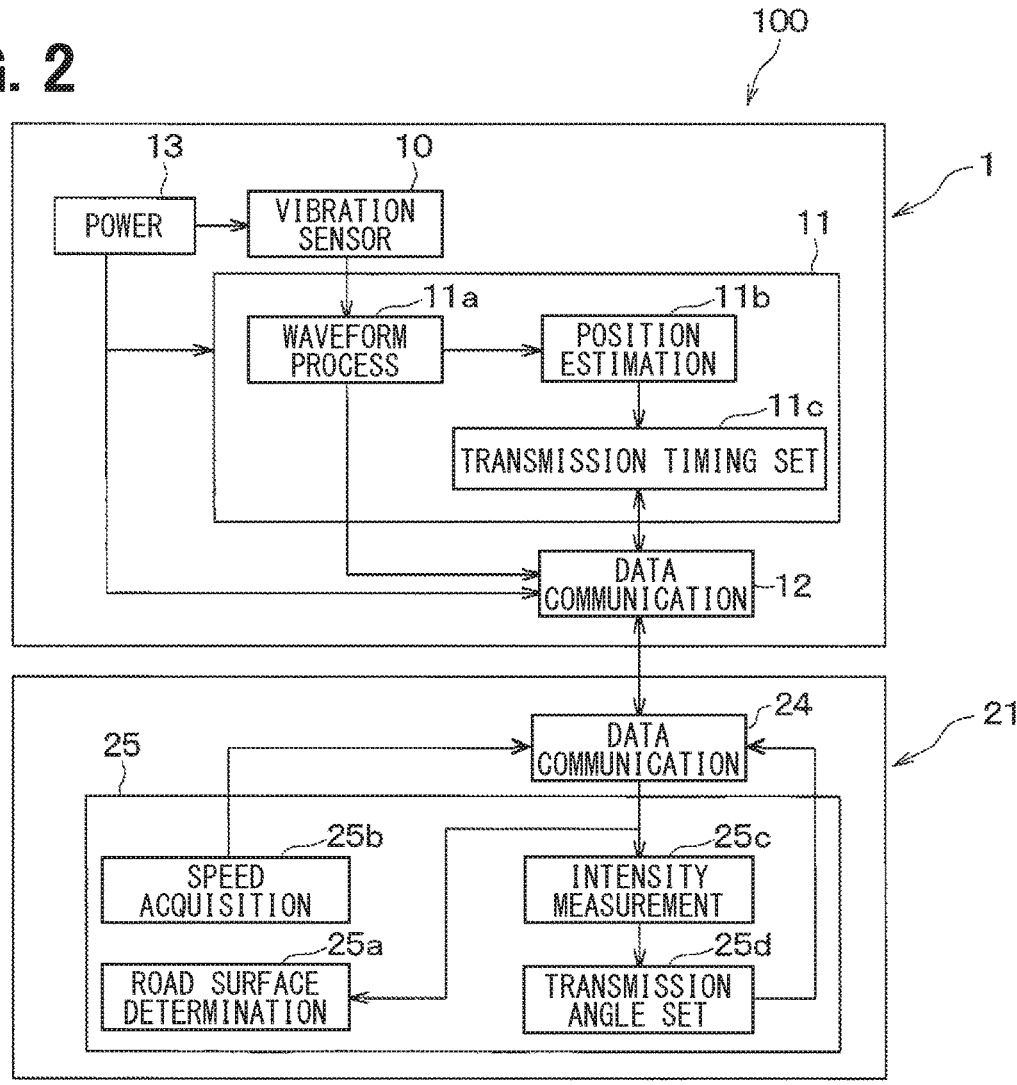
FIG. 2 is a block diagram showing respective details of a tire side device and a vehicle body side system.

A tire system 100 having a road surface condition determination function according to the present embodiment will be described with reference to FIG. 1 to FIG. 9. As shown in FIG. 1 and FIG. 2, the tire system 100 according to the present embodiment is configured to determine a road surface condition during traveling based on vibration applied to a ground contact surface of a tire provided in each road wheel of a vehicle, and also perform warning of danger of the vehicle, vehicle motion control and the like based on the determined road surface condition.

The tire system 100 is configured to have tire side devices 1 provided on road wheel sides and a vehicle body side system 2, which includes various parts provided on a vehicle body side. The vehicle body side system 2 includes a receiver 21, an electronic control unit for brake control (hereinafter referred to as a brake ECU) 22, a notification device 23 and the like. A part of the tire system 100, which performs a road surface condition determination operates as a road surface condition determination device. In the present embodiment, the tire side device 1 and the receiver 21 of the vehicle body side system 2 operate as the road surface condition determination device.

The tire system 100 according to the present embodiment is configured to transmit data (hereinafter, referred to as road surface data) corresponding to a road surface condition of a road on which the tire 3 moves from the tire side device 1, and receive the road surface data by the receiver 21 to determine the road surface condition. In addition, the tire system 100 is configured to transmit a determination result of the road surface condition determined by the receiver 21 to the notification device 23 and cause the notification device 23 to notify the determination result of the road surface condition. It is thus made possible to notify a driver of the road surface condition, for example, that the road surface is dry, wet or frozen. It is also made possible to warn the driver if the road surface is slippy. In addition, the tire system 100 is configured to perform vehicle motion control for avoiding danger by transmitting the road surface condition to the brake ECU 22 and the like that perform vehicle motion control. For example, when the road surface is frozen, the braking force generated with respect to the brake operation amount is weakened as compared with the case of a dry road, so that the vehicle motion control corresponding to a low road surface p is performed. Specifically, the tire side device 1 and the vehicle body side system 2 are configured as follows.

Figure 3:
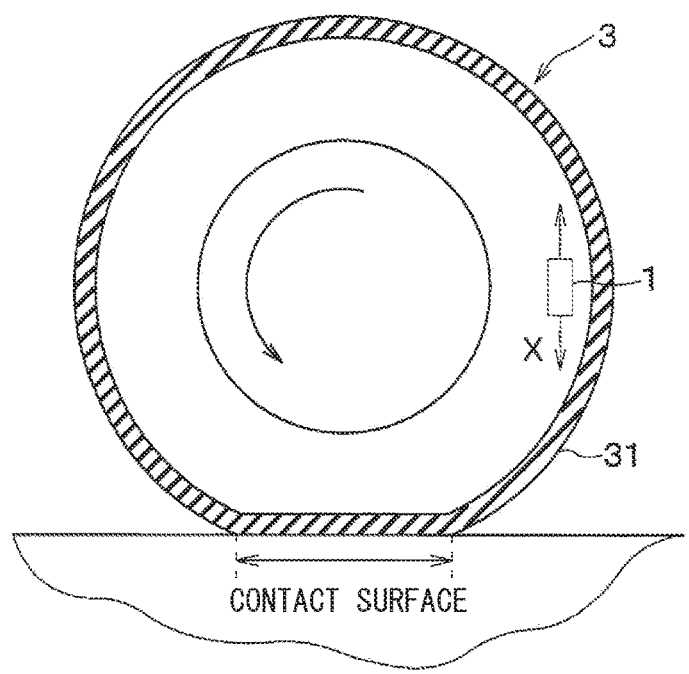
FIG. 3 is a schematic view showing in cross section a tire to which the tire side device is attached.

As shown in detail in FIG. 2, the tire side device 1 of each tire 3 is configured to include a vibration sensor unit 10, a control unit 11, a data communication unit 12 and a power source unit 13. As shown in FIG. 3, the tire side device 1 is provided on a back surface side of a tread 31 of the tire 3.

The vibration sensor unit 10 is configured as a vibration detection unit for detecting vibrations applied to the tire 3. For example, the vibration sensor unit 10 is configured by an acceleration sensor. In case that the vibration sensor unit 10 is the acceleration sensor, the vibration sensor unit 10 outputs a detection signal of acceleration as a detection signal, which corresponds to the vibration in a direction tangential to a circular trajectory drawn up by the tire side device 1 at the time of rotation of the tire 3, that is, a tire tangential direction indicated by an arrow X in FIG. 3. More specifically, the vibration sensor unit 10 generates as the detection signal an output voltage, which is positive in one direction and negative in the opposite direction, between two directions indicated with the arrow X. For example, the vibration sensor unit 10 performs acceleration detection at a predetermined sampling cycle set at a cycle shorter than one rotation of the tire 3, and outputs a detection result as the detection signal. Although the detection signal of the vibration sensor unit 10 may be represented as an output voltage or an output current, the detection signal is exemplified to be the output voltage in the present embodiment as an example.

The control unit 11 is provided as a first control unit and configured by a microcomputer having a CPU, a ROM, a RAM, an I/O, etc., to perform signal processing of the detection signal according to a program stored in the ROM or the like, and produce road surface data representing a road surface condition appearing in the detection signal. The control unit 11 includes a waveform processing unit 11a, a position estimation unit 11b, and a transmission timing generation unit 11c, which are functions performed by software processing.

The waveform processing unit 11a uses the detection signal output from the vibration sensor unit 10 as a detection signal representing the vibration data in the tire tangential direction, and performs waveform processing of the vibration waveform indicated by the detection signal to generate a raw waveform of the detection signal and the road surface data. For example, the waveform processing unit 11a inputs the detection signal of the vibration sensor unit 10 at every predetermined sampling period and performs the waveform processing. In case of the present embodiment, the waveform processing unit 11a processes the detection signal of the acceleration of the tire 3 (tire G) to extract a characteristic value of the tire G, and outputs data including the characteristic value as road surface data. Further, the waveform processing unit 11a transmits the generated raw waveform data to the position estimation unit 11b and the road surface data to the data communication unit 12.

As will be described later, the data transmission of the road surface data from the data communication unit 12 is performed once or a plurality of times every time the tire 3 makes a plurality of rotations, for example, every 10 rotations. Therefore, the waveform processing unit 11a may extract the characteristic value of the tire G for each rotation of the tire 3, but may extract the characteristic value only when the data transmission is performed from the data communication unit 12 during the tire rotation. Details of the characteristic value will be described later.

The position estimation unit 11*b* estimates an angle of the tire side device 1, specifically, an angular position at which the tire side device 1 is located relative to a predetermined position, for example, center of the tire 3. The angle of the tire side device 1 is hereinafter referred to as an existence angle. The position estimation unit 11*b* estimates the existence angle based on the raw waveform data of the detection signal of the vibration sensor unit 10 transmitted from the waveform processing unit 11*a* at each sampling cycle and vehicle speed data transmitted from the vehicle body side system 2 as described later.

Figure 4:
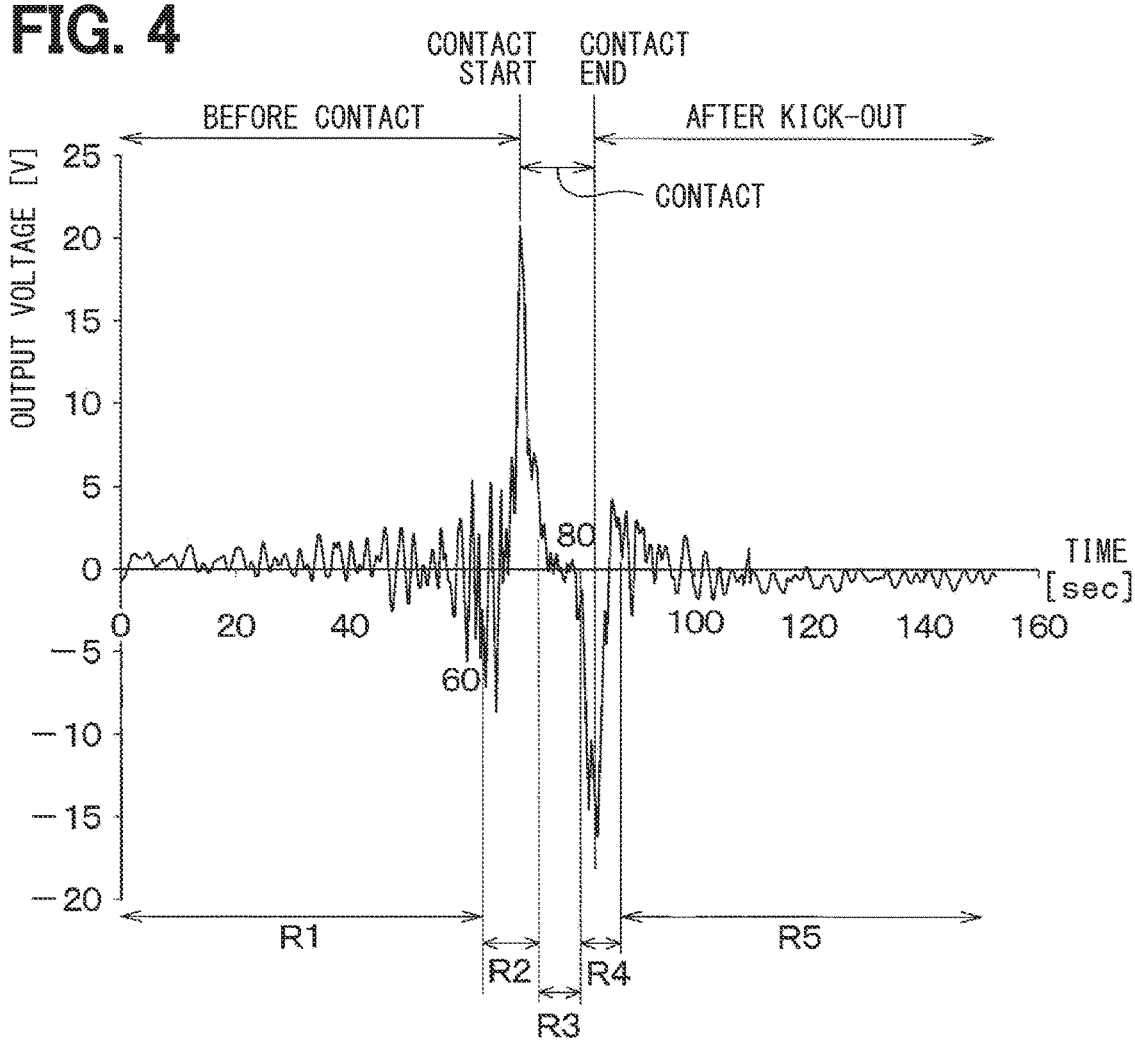
FIG. 4 is a time chart showing an output voltage waveform of a vibration sensor unit during rotation of the tire.

For example, the output voltage waveform of the detection signal of the vibration sensor unit 10 output during tire rotation changes as shown in FIG. 4. As shown in this figure, the output voltage of the vibration sensor unit 10 has a local maximum value when a portion of the tread 31 corresponding to the location of the vibration sensor unit 10 (hereinafter, referred to as a device mounting position) starts to contact the ground during rotation of the tire 3. Hereinafter, a peak value at the start time of contacting the ground where the output voltage of the vibration sensor unit 10 has the local maximum value is referred to as a first peak value. Further, as shown in FIG. 4, the output voltage of the vibration sensor 10 has a local minimum value at a ground contact end time at which the part of the tire corresponding to device mounting position is separated from the ground. Hereinafter, a peak value at the end time of contacting the ground where the output voltage of the vibration sensor unit 10 has the local minimum value is referred to as a second peak value.

The output voltage of the vibration sensor unit 10 takes the peak values at the above-described timings for the following reasons. When the device arrangement location comes to contact the ground during rotation of the tire 3, the part of the tire 3 having been in generally cylindrical shape near the vibration sensor 12 is pressed and deformed in a planar shape. In response to an impact at this time, the output voltage of the vibration sensor unit 10 takes the first peak value. When the part of the tire 3 corresponding to the device arrangement location leaves the ground surface during rotation of the tire 3, the part of the tire 3 corresponding to the vibration sensor unit 10 is released from pressurization and restores the generally cylindrical shape from the planar shape. With reception of an impact at the time of restoring the original shape of the tire 3, the output voltage of the vibration sensor unit 10 takes the second peak value. As described above, the output voltage of the vibration sensor unit 10 takes the first peak value and the second peak value at the ground contact start time and the ground contact end time, respectively. Since a direction of the impact at the time when the tire 3 is pressed and a direction of the impact at the time when the tire 3 is released from pressurization are opposite, polarities of the output voltage are also opposite.

Here, a moment when the device mounting position touches the road surface is referred to as a kick-in region which is a contact start region, and a moment when the device mounting position is separated from the road surface is referred to as a kick-out region which is a contact end region. The kick-in region includes the timing of the first peak value, and the kick-out region includes the timing of the second peak value. Further, a region before the kick-in region is referred to as a pre-contact region, a region from the kick-in region to the kick-out region, that is, the region in which the device arrangement position is in contact with the ground is referred to as a contacting region, and the region after the kick-out region is referred to as a post-contact region. In this way, the period in which the device mounting position is grounded and before and after the period can be divided into five time zones. In FIG. 4, the pre-kick-in region, the kick-in region, the pre-kick-out region, the kick-out region and the post-kick-out region of the detection signal are indicated as five zones R1 to R5 in sequence, respectively.

As described above, the output voltage waveform of the detection signal of the vibration sensor unit 10 has the peak values at the time of starting the grounding or ending the grounding of the mounting position of the device. Since a time period required for the tire 3 to make one rotation can be estimated from the vehicle speed data, the existence angle existence angle of the device can be estimated during the rotation of the tire 3 based on the detection signal of the vibration sensor unit 10 indicating the tire vibration and the vehicle speed data. For example, the position estimation unit 11*b* estimates the existence angle of the device based on the time elapsed from the timing when the detection signal of the vibration sensor unit 10 reaches the first peak value or the second peak value and the time required for the tire 3 to make one rotation, which is determined from the vehicle speed data.

It is noted here that the raw waveform data of the detection signal of the vibration sensor unit 10 is used to estimate the existence angle, but other waveform data may be used. For example, the existence angle may be estimated using a digital value acquired by A/D converting a magnitude of an amplitude of the detection signal.

The transmission timing generation unit 11*c* controls data transmission from the data communication unit 12, and outputs a command signal to the data communication unit 12 at a timing at which data transmission is desired so that the data communication unit 12 performs data communication with the receiver 21 of the vehicle body side system 2. Specifically, the transmission timing generation unit 11*c* detects an angle at which the road surface data is transmitted (hereinafter, this angle is referred to as a transmission angle), and transmits the command signal to the data communication unit 12 when the device angle estimated by the position estimation unit 11*b* becomes the transmission angle. The transmission angle is transmitted from the vehicle body side system 2, and is set to an angle at which data communication from the data communication unit 12 to the vehicle body side system 2 can be performed well. The method of setting the transmission angle will be described later. In the following description, the timing at which the device rotation angle estimated by the position estimation unit 11*b* becomes the transmission angle is referred to as a transmission angle timing.

The transmission timing generation unit 11*c* also detects the transmission angle timing for each rotation of the tire 3 and causes the data communication unit 12 to transmit the road surface data. However, the data may be transmitted at a rate of one or multiple times at every multiple number of rotations of the tire 3.

Further, the transmission timing generation unit 11*c* continuously transmits the measurement data of the transmission angle while the tire 3 makes one rotation, before the data on the transmission angle is transmitted from the vehicle body side system 2. The transmission angle is set in the vehicle body side system 2 based on the measurement data. The measurement data is transmitted as a signal having a constant radio field strength, and may be the raw waveform data itself of the detection signal of the vibration sensor unit 10 or may be dummy data for measurement. In case of the present embodiment, the measurement data includes existence angle data for each sampling period estimated by the position estimation unit 11b, so that the vehicle body side system 2 may acquire the existence angle at the timing when the measurement data is transmitted.

The data communication unit 12 is provided as a first data communication unit. The data communication unit 12, for example, stores the road surface data when the road surface data is transmitted from the waveform processing unit 11a, and transmits the road surface data at the timing when the command signal is transmitted from the transmission timing generation unit 11c at the transmission angle timing. As for the road surface data, it is appropriately updated and stored if it is generated every time the tire 3 makes one rotation in the waveform processing unit 11a, so that the latest data is transmitted.

In addition, when the waveform processing unit 11a generates the road surface data, it is transmitted to the data communication unit 12, and the data communication unit 12 store it. On the other hand, the road surface data may be transmitted to the data communication unit 12 in place of the command signal, when the road surface data generated by the waveform processing unit 11a is transmitted to the transmission timing generation unit 11c and the transmission timing generation unit 11c detects that the transmission angle timing has come. Further, the waveform processing unit 11a may store the road surface data and transmit it to the data communication unit 12 when the transmission timing generation unit 11c detects that the transmission angle timing has been reached. In these cases, the data communication unit 12 may transmit the data every time the road surface data is transmitted.

Further, the data communication unit 12 transmits the measurement data to the vehicle body side system 2 at the same time when the measurement data is transmitted from the transmission timing generation unit 11c. As a result, the measurement data is transmitted to the vehicle body side system 2. At this time, the measurement data is transmitted to the data communication unit 12 and simultaneously to the vehicle body side system 2. Further, the measurement data includes data of the existence angle of the timing when the measurement data is transmitted to the data communication unit 12. For this reason, the existence angle of the tire side device 1 at each timing when the measurement data is transmitted becomes the same as the existence angle included in the measurement data.

Further, the data communication unit 12, which performs bidirectional communication, operates to receive data sent from the vehicle body side system 2. For example, the data communication unit 12 receives the vehicle speed data and the transmission angle data, which is the data indicating the transmission angle, from the vehicle body side system 2, and transmits the data to the transmission timing generation unit 11c.

The data communication unit 12 is exemplified as a single unit, but may be configured separately as a transmitting unit and a receiving unit. Various forms of bidirectional communication may be applied, such as Bluetooth communication including BLE (Bluetooth Low Energy) communication, wireless LAN (Local Area Network) such as wifi, Sub-GHz communication, ultra wideband Communication, ZigBee, etc. can be applied. "Bluetooth" is a registered trademark.

The power supply unit 13 is provided as a power supply for the tire side device 1, and supplies electric power to each unit included in the tire side device 1 so that each unit can be operated. The power supply unit 13 is configured by a battery such as a button battery, for example. Since the tire side device 1 is provided within the tire 3, the battery cannot be easily replaced. It is therefore necessary to reduce power consumption.

On the other hand, the receiver 21, the brake ECU 22 and the notification device 23 forming the vehicle body side system 2 are configured to become operable when a start switch such as an ignition switch (not shown) of the vehicle is turned on.

As shown in FIG. 2, the receiver 21 is configured to include a data communication unit 24 and a control unit 25.

The data communication unit 24 is provided as a second data communication unit, and performs bidirectional communication with the data communication unit 12 of the tire side device 1. Specifically, the data communication unit 24 receives the road surface data including the characteristic value transmitted from the data communication unit 12 and transmits the road surface data to the control unit 25. The data communication unit 24 further transmits the vehicle speed data and the transmission angle data sent from the control unit 25 to each tire side device 1, as described later. The data communication unit 24 is exemplified as a single unit, but may be configured separately as a transmitting unit and a receiving unit.

The control unit 25 is provided as a second control unit and configured by a well-known microcomputer including a CPU, a ROM, a RAM, an I/O, and performs various processing according to a program stored in the ROM or the like to determine the road surface condition. Specifically, the control unit 25 sets the transmission angle of each tire side device 1 and determines the road surface condition, and includes a road surface determination unit 25a, a vehicle speed data acquisition unit 25b, a reception strength measurement unit 25c and a transmission angle setting unit 25d, which are functions performed by software processing.

The road surface determination unit 25a determines the road surface condition based on the road surface data transmitted from the tire side device 1. Specifically, the road surface determination unit 25 stores a support vector, and determines the road surface condition by comparing the road surface data transmitted from the control unit 11 with the stored support vector.

The support vector is set and stored for each type of road surface. The support vector is a characteristic value serving as a model, and is acquired, for example, by learning using a support vector machine. The support vector is acquired by experimentally driving a vehicle equipped with the tire side device 1 on each type of road surface. During the experimental driving, the characteristic value extracted by the control unit 11 is learned for a predetermined number of tire rotations, and a predetermined number of typical characteristic values is extracted from the learned data. For example, the characteristic values are learned for one million rotations for each type of road surface, and a typical characteristic value for 100 rotations is extracted from the learned values as the support vector.

Then, the road surface determination unit 25 determines the road surface condition by comparing the characteristic value transmitted from the tire side device 1 received by the data communication unit 24 with the stored support vector for each type of road surface. For example, the road surface determination unit 25a compares the characteristic value included in the road surface data received at present time with the support vector stored for each type of the road surface, and determines the road surface corresponding to the support vector which is closest to the present characteristic value to be a presently traveling road surface.

After determining the road surface condition, the road surface determination unit 25a transmits the determined road surface condition to the notification device 23, which notifies a driver of the road surface condition if necessary. Thus, the driver is enabled to try to drive the vehicle in a manner matching the road surface state and avoid danger to the vehicle. For example, the determined road surface condition may be displayed always by the notification device 23 or the road surface condition may be displayed to warn the driver only when the vehicle need be driven more carefully than usual, for example, when the determined road surface condition corresponds to a wet road or a frozen road. The road surface condition is transmitted from the receiver 21 to an ECU such as the brake ECU 22, which performs vehicle motion control, so that the vehicle motion control is performed based on the transmitted road surface condition.

The vehicle speed data acquisition unit 25b is provided to transmit the vehicle speed data, which is data corresponding to the vehicle speed, to the data communication unit 24 thereby transmitting the data to the tire side device 1. For example, the vehicle speed data acquisition unit 25b transmits the vehicle speed data to the data communication unit 24 at each transmission timing of the road surface data when the vehicle speed reaches a predetermined speed that requires road surface condition determination, for example, 20 km/h or more. The vehicle speed data acquisition unit 25b may directly acquire the data indicating the vehicle speed itself and transmit it as the vehicle speed data to the data communication unit 24. Alternatively, the vehicle speed data acquisition unit 25b may acquire data necessary for calculating the vehicle speed, calculate the vehicle speed and transmit the calculation result to the data communication unit 24 as data as the vehicle speed data. For example, since the brake ECU 22 handles data indicating the vehicle speed itself in order to perform the brake control, the data can be transmitted from the brake ECU 22 to the vehicle speed data acquisition unit 25b as the vehicle speed data.

The reception strength measurement unit 25c is provided to measure a reception strength, which is an intensity of received signal, upon receiving the measurement data transmitted from the tire side device 1. Since the measurement data is continuously transmitted during the tire 3 makes one rotation, the reception strength measurement unit 25c continuously measures the reception strength of the measurement data during the period and transmits a measurement result to the transmission angle setting unit 25d together with the measurement data.

The transmission angle setting unit 25d sets the transmission angle based on the reception strength during one rotation of the tire rotation transmitted from the reception strength measurement unit 25c and the existence angle data for each sampling cycle included in the measurement data. Specifically, the transmission angle setting unit 25d extracts the time when the reception strength is the highest during one rotation of the tire 3, and sets the existence angle included in the measurement data at that extracted time as the transmission angle. Then, the transmission angle setting unit 25d notifies the data communication unit 24 of the data regarding the set transmission angle. As a result, the data communication unit 24 transmits the data regarding the transmission angle to the tire side device 1 that has transmitted the measurement data. In this way, the transmission angle can be transmitted to each tire side device 1.

In the vehicle body side system 2, it is preferable that the transmission from each tire side device 1 is performed at different timings since the measurement data is continuously transmitted from each tire side device 1 during one rotation of the tire 3. For example, the measurement data may be transmitted after the tire 3 completes a predetermined number of rotations after starting the rotations, and the number of rotations at the time of transmission may be randomly set in each tire side device 1. Alternatively, the vehicle body side system 2 may transmit a command signal to each tire side device 1 to transmit the measurement data, and each tire side device 1 may transmit the measurement data at different timings.

The brake ECU 23 is provided as a braking control device which performs various types of brake control. The brake ECU 23 drives an actuator for brake fluid pressure control to generate a brake fluid pressure automatically and pressurizes a wheel cylinder to generate a braking force. In addition, the brake ECU 23 independently controls the braking force of each wheel. When the road condition is transmitted from the receiver 21, the brake ECU 22 controls the braking force as the vehicle motion control based on the transmitted road surface condition. For example, when the transmitted road surface condition indicates a frozen road, the brake ECU 22 weakens the braking force generated in response to the amount of brake operation by the driver, as compared with a dry road surface. Thereby, wheel slip can be suppressed, and safety of the vehicle can be ensured.

The notification device 22 is configured with a meter display device, for example, and used to notify the driver of the road surface condition. In case that the notification device 23 is configured with the meter display device, it is located at a position which the driver is capable of recognition during driving of the vehicle, for example, within an instrument panel in the vehicle. When the road surface condition is transmitted from the receiver 21, the meter display device visually notifies the driver of the road surface condition by performing display in such a manner that the condition of the road surface can be recognized.

The notification device 23 may alternatively be configured as a buzzer or a voice guidance device. In such a case, the notification device 23 notifies the driver of the road surface condition audibly by buzzer sound or voice guidance. Although the meter display device is exemplified as the notification device 23 providing visual notification, the notification device 23 may be configured as a display device that displays information such as a head-up display.

The tire system 100 is configured as described above in the present embodiment. Each unit forming the vehicle body side system 2 is connected through an in-vehicle LAN (Local Area Network) like CAN (Controller Area Network) communication. Each unit forming the vehicle body side system 2 is connected through an in-vehicle LAN (Local Area Network) like CAN (Controller Area Network) communication. Thus each unit is capable of communicating information mutually through the in-vehicle LAN.

Next, details of the characteristic value extracted by the control unit 11 described above will be described below.

The characteristic value referred to herein is a quantity indicative of a value indicating a feature of vibration applied to the tire 3 and acquired by the vibration sensor unit 10.

As described above, the output voltage waveform of the detection signal of the vibration sensor unit 10 has a waveform as shown in FIG. 4, and is divided into the regions R1 to R5 shown in FIG. 4, for example. The vibration generated in the tire 3 varies in each of the divided regions in correspondence to the road surface condition, and the detection signal of the vibration sensor unit 10 changes. Therefore, by analyzing a frequency of the detection signal of the vibration sensor unit 10 in each region, the road surface condition of the vehicle on the road surface is detected. For example, in a slippy road surface such as a snow-covered road, the shearing force at the time of kicking out decreases, so that a frequency band value selected from 1 kHz to 4 kHz band in the kick-out region R4 and the post-kick-out region R5 decreases. Since each frequency component of the detection signal of the vibration sensor unit 10 changes according to the road surface condition, it is possible to determine the road surface condition based on the frequency analysis of the detection signal.

Figure 5:
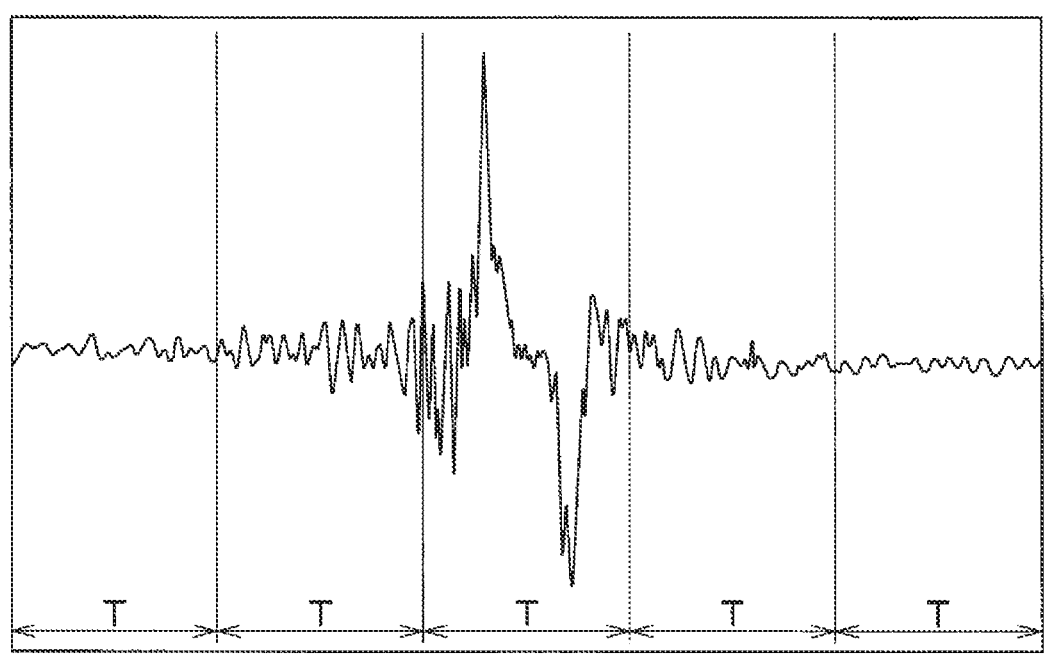
FIG. 5 is a chart which shows a detection signal of the vibration sensor unit in a manner divided into plural time zones, each of which is a time window of a predetermined time width T.

The waveform processing unit 11*a* divides the detection signal of the vibration sensor unit 10 for one rotation of the tire 3 having a continuous time-axis waveform into a plurality of sections each having a predetermined time width T as shown in FIG. 5, performs the frequency analysis in each section, and extracts the characteristic value. Specifically, by performing the frequency analysis in each section, the waveform processing unit 13*a* calculates a power spectrum value in each frequency band, that is, a vibration level in a specific frequency band, as the characteristic value.

The number of sections divided by the time window of the time width T is a value that varies with the vehicle speed, more specifically, with the rotation speed of the tire 3. In the following description, the number of sections for one rotation of the tire 3 is assumed to be "n" (where "n" is a natural number).

For example, the characteristic value is calculated as the power spectrum value, which is acquired by passing the detection signal of each section through a plurality of filters of a specific frequency band, for example, five band-pass filters of 0 to 1 kHz, 1 to 2 kHz, 2 to 3 kHz, 3 to 4 kHz, and 4 to 5 kHz. This characteristic value is a characteristic vector Xi of a section "I" (natural number which is expressed as a matrix of elements defined by the following equation. In this matrix, each element is represented as the power spectrum value aik in each specified frequency band. This characteristic value is a characteristic vector Xi of a section "i" (natural number 1 which is expressed as a matrix of elements defined by the following equation 1.

$$X_i = \begin{bmatrix} a_{i1} \\ a_{i2} \\ a_{i3} \\ a_{i4} \\ a_{i5} \end{bmatrix} \quad \text{[Equation 1]}$$

"K" of the power spectrum value aik is the number of the specific frequency bands, that is, the number of the band-pass filters. In case that the frequency band of 0 to 5 kHz is divided into five sections as exemplified above, "k" is 1 to 5 (k=1 to 5). The determinant X that comprehensively represents the characteristic vectors X1 to Xn of all the sections 1 to n is as follows.

$$X = \begin{pmatrix} a_{11} & a_{21} & \cdots & a_{n1} \\ a_{12} & a_{22} & \cdots & a_{n2} \\ a_{13} & a_{23} & \cdots & a_{n3} \\ a_{14} & a_{24} & \cdots & a_{n4} \\ a_{15} & a_{25} & \cdots & a_{n5} \end{pmatrix} \quad \text{[Equation 2]}$$

This determinant X is an equation representing the characteristic value of one rotation of the tire. The control unit 11 extracts the characteristic value represented by the above determinant X by frequency-analyzing the detection signal of the vibration sensor unit 10.

Subsequently, an operation of the tire system 100 according to the present embodiment will be described.

First, when a start switch of a vehicle is turned on, electric power is supplied to each part of the vehicle body side system 2, and the receiver 21 and the like are made operable. Then, in the receiver 21, the vehicle speed data acquisition unit 25*b* acquires the vehicle speed data from the brake ECU 22 and the like, transmits the vehicle speed data to the data communication unit 24 at a predetermined timing, and through the data communication unit 24 to each tire side device 1. The control unit 25 of the receiver 21 executes vehicle body side processing shown in FIG. 6 at every predetermined control cycle in the road surface determination unit 25*a*, the reception strength measurement unit 25*c* and the transmission angle setting unit 25*d*.

First, in step S100, the control unit 25 checks whether the transmission angle data has been transmitted from the transmission angle setting unit 25*d*. Here, immediately after the start switch of the vehicle is turned on, it is determined that the transmission angle data has not been transmitted, and the processing proceeds to step S110.

In step S110, the control unit 25 receives the measurement data including the existence angle data sent from each tire side device 1 as described later. Then, the control unit 25 stores in step S120 the reception strength of the measurement data in association with the existence angle data included in the measurement data. After that, the control unit 25 checks in step S130 whether the measurement data from each tire side device 1 is received for one rotation of the tire, and repeats steps S110 and S120 until the measurement data for one rotation of the tire 3 is received. As a result, the control unit 25 stores the reception strength of the measurement data for each existence angle for one rotation of the tire 3.

Then, when the measurement data for one rotation of the tire 3 is received, the control unit 25 sets in step S140 the existence angle at which the reception strength of the measurement data received for one rotation of the tire 3 is maximum as the transmission angle. The device mounting position changes while the detection signal of the vibration sensor unit 10 makes one rotation of the tire, that is, while the device mounting position contacts the ground and the first peak value and the second peak value are repeated. The reception strength of the measurement data also changes accordingly. Therefore, the timing at which the reception strength is maximized is extracted, and the existence angle included in the measurement data at the timing at which the reception strength is maximized is set as the transmission angle.

After that, the control unit 25 transmits in step S150 the transmission angle data indicating the transmission angle set in step S140 to the tire side device 1 that has transmitted the measurement data. Further, the control unit 25 stores, as a history, that the transmission angle data has been transmitted, for example, by setting a transmission-completed flag provided in the transmission angle setting unit 25*d*.

On the other hand, each tire side device 1 is in a sleep state before the vehicle travels, but is activated when the vehicle starts to travel. For example, the control unit 11 activates each function in the sleep state by inputting the detection signal of the vibration sensor unit 10 and detecting the rotation of the tire 3, that is, the traveling of the vehicle based on the waveform of the detection signal exceeding a predetermined threshold value. Then, the control unit 11 execute the data transmission processing shown in FIG. 8 every predetermined control cycle by the waveform processing unit 11a, the position estimation unit 11b and the transmission timing generation unit 11c.

First, in step S200, the control unit 11 inputs the detection signal of the vibration sensor unit 10 in the waveform processing unit 11a and generates the raw waveform data and the road surface data by using this detection signal.

Regarding the road surface data, the waveform processing unit 11a acquires the time-axis waveform of the detection signal of the vibration sensor unit 10 for one rotation of the tire 3 and generates the road surface data based on the acquired waveform. Specifically, the waveform processing unit 11a divides the acquired detection signal of the time-axis waveform into a plurality of sections for each time window of the predetermined time width T. After that, the waveform processing unit 11a performs frequency analysis on the time-axis waveform of each of the divided sections, acquires a power spectrum value in each frequency band, calculates the characteristic value for one rotation of the tire, and generates the road surface data including data of the characteristic value. Then, when the road surface data is generated in this way, it is transmitted to the data communication unit 12.

On the other hand, the raw waveform data is generated every predetermined control cycle. Each time the raw waveform data is generated, the processing proceeds to the subsequent step S210.

In step S210, the control unit 11 estimates the existence angle in the position estimation unit 11b based on the vehicle speed data transmitted from the vehicle body side system 2 and the raw waveform data transmitted from the waveform processing unit 11a. After that, the control unit 11 checks by the transmission timing generation unit 11c in step S220 whether the transmission timing generation unit 11c has received the transmission angle data from the vehicle body system 2. Here, if the transmission angle data has not been received yet, a negative determination is made and the processing proceeds to step S230. Then, in step S230, the control unit 11 transmits the measurement data including the existence angle data to the vehicle body side system 2 through the data communication unit 12.

Figure 6:
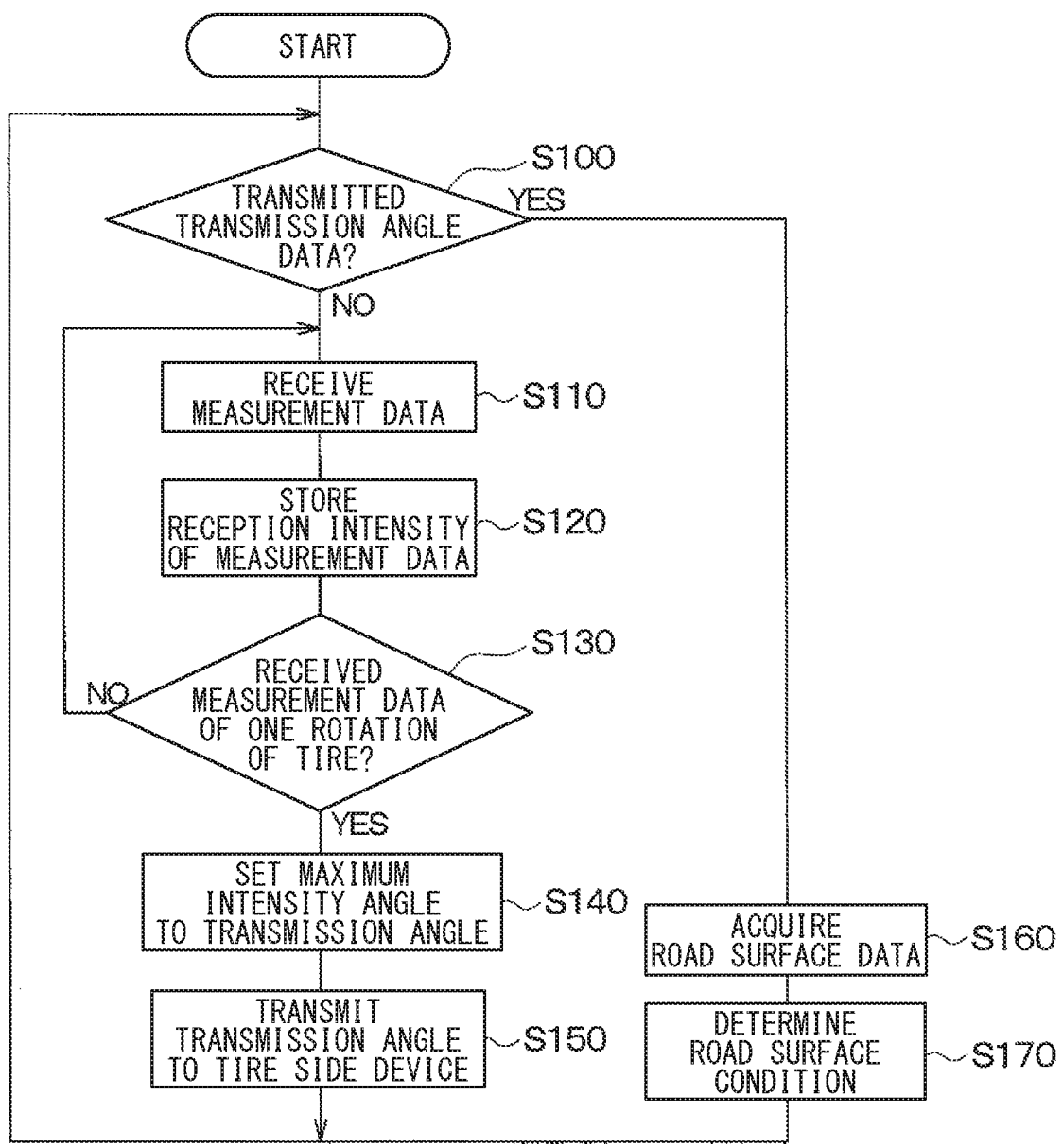
FIG. 6 is a flowchart showing details of vehicle body side processing according to the first embodiment.
Figure 7:
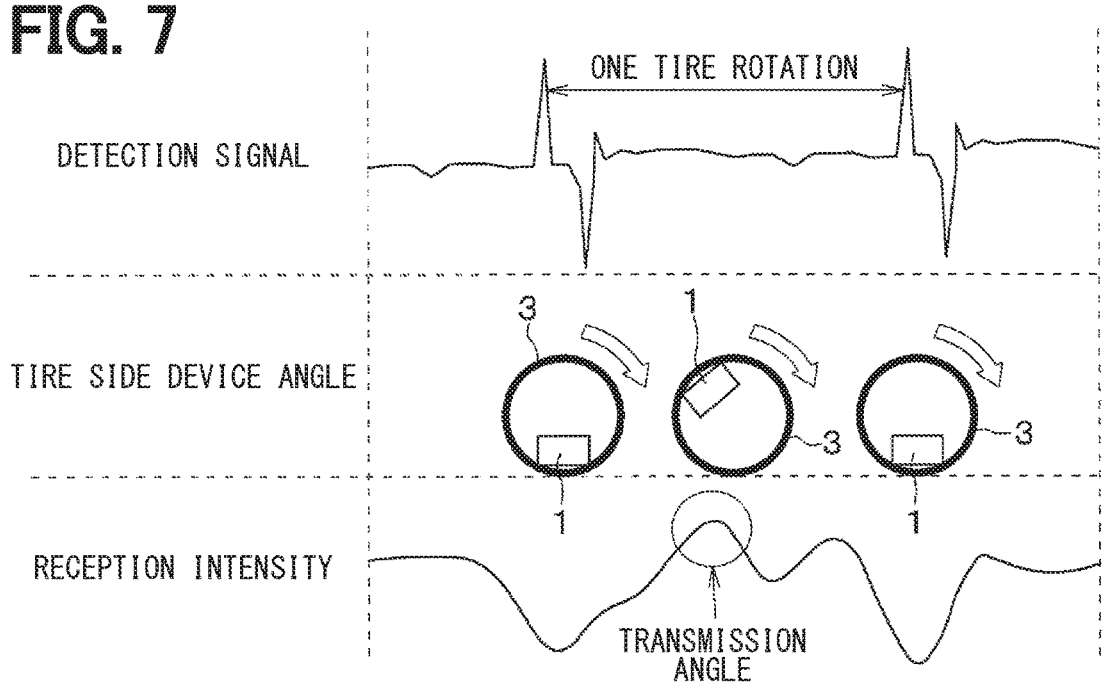
FIG. 7 is a time chart showing changes in the detection signal of the vibration sensor unit, an angle of the tire side device, and a signal reception strength of measurement data during rotation of the tire.

It should be noted that, until at least one rotation of the tire 3 is made, a negative determination is made in step 130 of FIG. 6, the transmission angle data is not transmitted in step S150, and the processing in steps S200 to S230 is repeated. Therefore, the waveform processing unit 11a continues to transmit the measurement data to the vehicle body side system 2 until the tire 3 makes one rotation.

Further, if the transmission angle data is transmitted from the vehicle body side system 2 and an affirmative decision is made in step S220, the processing proceeds to step S240. Then, the control unit 11 checks by the transmission timing generation unit 11c whether the current existence angle is the transmission angle, and repeats the processing from step S200 until the existence angle becomes the transmission angle. As a result, the waveform processing unit 11a continues the processing of acquiring the time-axis waveform of the detection signal of the vibration sensor unit 10 until the tire 3 makes one rotation, and as described above, generates the road surface data of one rotation of the tire 3 based on the detection signal of one rotation of the tire 3.

Then, if an affirmative determination is made in step S240, the control unit 11 outputs in step S250, the command signal to the data communication section 12 by the transmission timing generation unit 11c, so that the road surface data transmitted from the waveform processing unit 11a is transmitted to the vehicle body side system 2 When the existence angle of each tire side device 1 becomes the transmission angle, the road surface data is transmitted from each tire side device 1 to the vehicle body side system 2.

Figure 8:
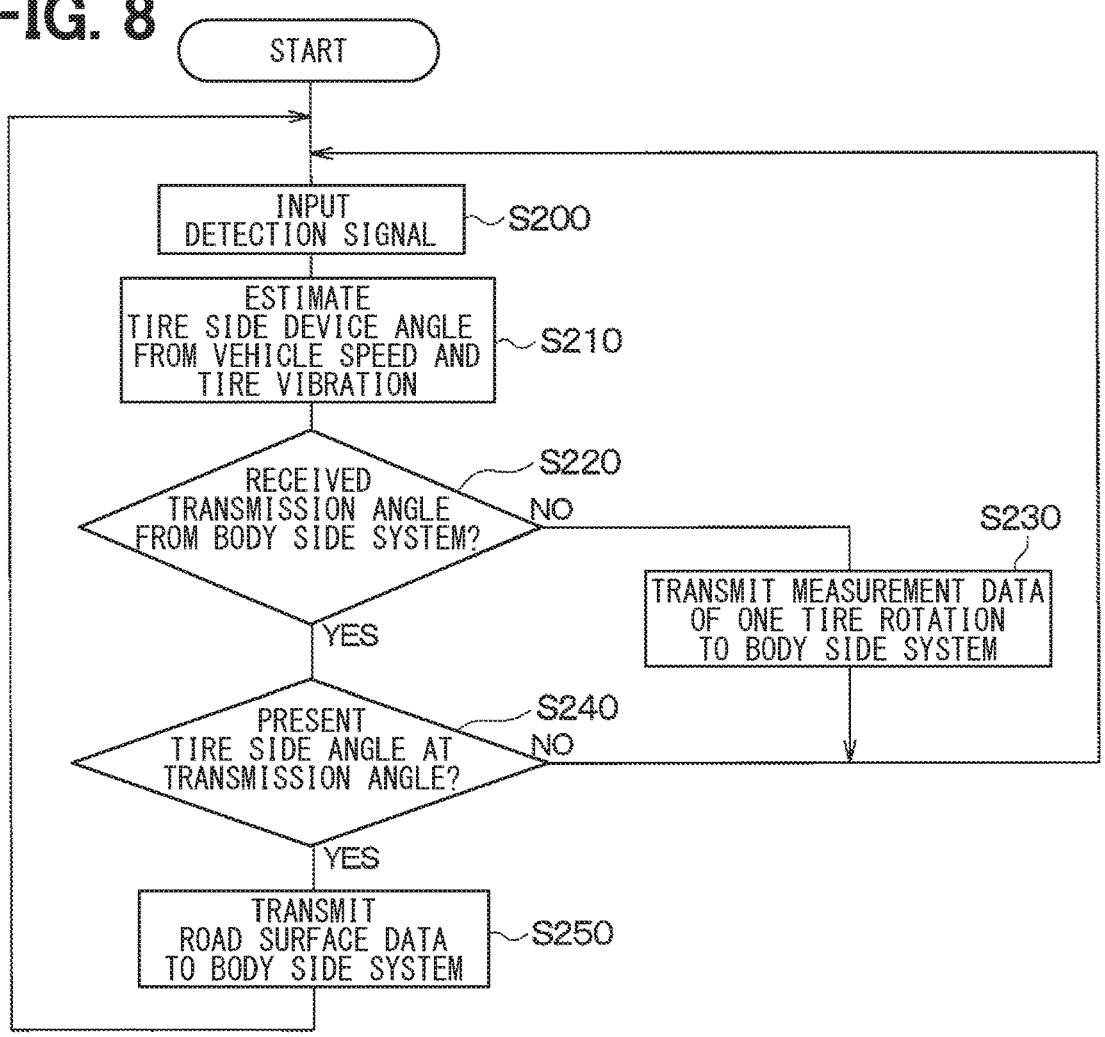
FIG. 8 is a flowchart showing details of tire side processing according to the first embodiment.

In case the tire side processing shown in FIG. 8 is performed, the road surface data is transmitted every time the existence angle becomes the transmission angle, that is, every time the tire 3 makes one rotation. However, the road surface data may alternatively be transmitted each time the tire 3 makes a plurality of rotations.

Further, in the vehicle body side system 2, when the transmission of the transmission angle data in step S150 described above is completed, a positive determination is made in step S100. Therefore, the control unit 25 receives in step S160 the road surface data transmitted from the tire side device 1 when the existence angle becomes the transmission angle. Then, in step S170, the road surface determination unit 25a determines the road surface state based on the received road surface data. The determination of the road surface condition is performed by comparing the characteristic value included in the received road surface data with the support vector for each type of road surfaces stored in the road surface determination unit 25a. For example, the similarity between the characteristic value and all the support vectors for each type of road surface is acquired, and the road surface of the support vector having the highest similarity is determined as the current traveling road surface.

For example, the calculation of a degree of similarity of the characteristic value to all the support vectors stored for each type of the road surfaces can be performed by a method as described below.

As described above, for the determinant X representing the characteristic value, the determinant of the characteristic value is expressed as X(r), the determinant of the support vector is expressed as X(s), and the power spectrum value aik as each element of the determinants is expressed by a(r)ik and a(s)ik. In this case, the determinant X(r) of the characteristic value and the determinant X(s) of the support vector are respectively expressed as follows.

$$X(r) = \begin{pmatrix} a(r)_{11} & a(r)_{21} & \cdots & a(r)_{n1} \\ a(r)_{12} & a(r)_{22} & \cdots & a(r)_{n2} \\ a(r)_{13} & a(r)_{23} & \cdots & a(r)_{n3} \\ a(r)_{14} & a(r)_{24} & \cdots & a(r)_{n4} \\ a(r)_{15} & a(r)_{25} & \cdots & a(r)_{n5} \end{pmatrix} \quad \text{[Equation 3]}$$

$$X(s) = \begin{pmatrix} a(s)_{11} & a(s)_{21} & \cdots & a(s)_{n1} \\ a(s)_{12} & a(s)_{22} & \cdots & a(s)_{n2} \\ a(s)_{13} & a(s)_{23} & \cdots & a(s)_{n3} \\ a(s)_{14} & a(s)_{24} & \cdots & a(s)_{n4} \\ a(s)_{15} & a(s)_{25} & \cdots & a(s)_{n5} \end{pmatrix} \quad \text{[Equation 4]}$$

The similarity indicates the degree of similarity between the characteristic value indicated by the two determinants and the support vector, and means that the higher the degree of similarity, the more similar. In case of the present embodiment, the road surface determination unit 25a calculates the similarity using the kernel method, and determines the road surface condition based on the similarity. In case of the present embodiment, the road surface determination unit 22a calculates the similarity using the kernel method, and determines the road surface condition based on the similarity. Here, the inner product of the determinant X(r) of the characteristic value and the determinant X(s) of the support vector, that is, a distance between coordinates indicated by the characteristic vectors Xi of the sections divided for each time window of the predetermined time width T in a characteristic space, is calculated and used as the degree of similarity.

Figure 9:
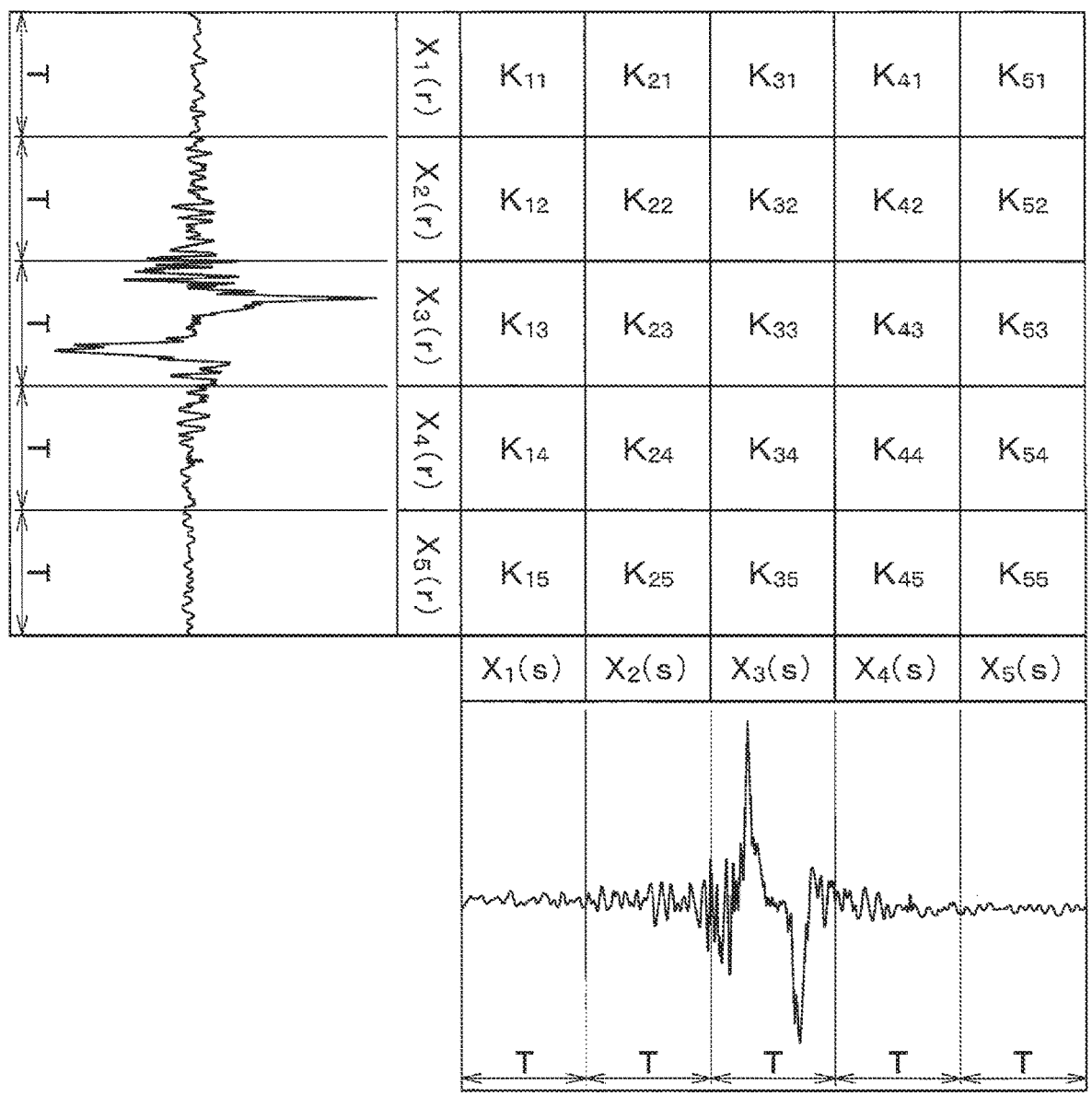
FIG. 9 is a graph illustrating respective relationships between determinants Xi(r) and Xi(s) and a distance Kyz in each of the segments determined by dividing, by each of the time windows having the predetermined time width T, a time-axis waveform during a tire rotation of present time and a time-axis waveform during an immediately previous tire rotation.

For example, as shown in FIG. 9, regarding the time-axis waveform of the detection signal of the vibration sensor unit 10, each of the time-axis waveform at the time of present rotation of the tire 3 and the time-axis waveform of the support vector is divided into each section by the time window of the predetermined time width T. In the illustrated example, since each time-axis waveform is divided into five sections, "n" is 5, and "i" is represented by Here, as shown in the figure, the characteristic vector Xi of each section at the time of present rotation of the tire 3 is Xi(r), and the characteristic vector of each section of the support vector is Xi(s). In this case, regarding the distance Kyz between the coordinates indicated by the characteristic vector Xi of each section, it is shown like a cell where a horizontal cell including the characteristic vector Xi(r) of each section at the time of present rotation of the tire 3 and a vertical cell containing the characteristic vector Xi(s) of the support vector intersect. As for the distance Kyz, "y" is determined by rewriting "i" in Xi (s), and "z" is determined by rewriting "i" in Xi(r). It should be noted that the numbers of sections between the support vector and the present rotation of the tire 3 may become different depending on the vehicle speed. It is however assumed here that the numbers of sections are equal.

In case of the present embodiment, the characteristic vectors are acquired by dividing into five specific frequency bands. Therefore, the characteristic vector Xi of each section is represented in the six-dimensional space combined with the time-axis, and the distance between the coordinates indicated by the characteristic vectors Xi of the sections is the distance between the coordinates in the six-dimensional space. However, the distance between the coordinates indicated by the characteristic vector of each section is smaller and larger as the characteristic value and the support vector are more similar and less similar, respectively. Therefore, the similarity becomes higher as the distance becomes smaller, and the similarity becomes lower as the distance becomes larger.

For example, in case the segments 1 to n are provided by time division, each of the distances Kyz between the coordinates represented by the characteristic vectors of the individual segments 1 is expressed by the following equation.

$$Kyz = \sqrt{\{a(r)_{11} - a(s)_{11}\}^2 + \{a(r)_{12} - a(s)_{12}\}^2 + \cdots \{a(r)_{15} - a(s)_{15}\}^2}$$ [Equation 5]

In this way, the distance Kyz between the coordinates indicated by the characteristic vectors of the sections by time division is acquired for all the sections, a total sum Ktotal of the distances Kyz of all sections is calculated, and this total Ktotal is used as a value corresponding to the similarity. Then, the total Ktotal is compared with a predetermined threshold value Th. If the total Ktotal is larger than the threshold value Th, the similarity is determined to be low. If the total Ktotal is smaller than the threshold value Th, the similarity is determined to be high. Then, the similarity is calculated for all the support vectors, and it is determined that the type of the road surface corresponding to the support vector having the highest similarity is determined to be the road surface condition of the presently traveling road. Thus, the road surface condition can be determined.

Here, the total sum Ktotal of the distances Kyz between the two coordinates indicated by the characteristic vectors of the respective sections is used as the value corresponding to the similarity. However, another parameter indicating the similarity may be used. For example, as a parameter indicating the similarity, an average distance Kave, which is an average value of distances Kyz calculated by dividing the total sum Ktotal by the number of sections, may be used, or the similarity may be determined by using various kernel functions as proposed conventionally. Instead of using all of the characteristic vectors, the similarity may be calculated by excluding a path having a low similarity from the characteristic vectors.

As described above, the tire system 100 according to the present embodiment can determine the road surface condition of the traveling road surface of the vehicle. Further, as described above, the road surface data is transmitted from the tire side device 1 when the existence angle becomes the transmission angle. Therefore, the road surface data can be transmitted at the transmission timing when the reception strength at the receiver 21 is maximum, and the receiver 21 can accurately receive the road surface data. That is, even in case the data communication environment changes, the road surface data is satisfactorily transmitted from the tire side device 1 to the vehicle body side system 2.

It should be noted that it is possible to set the transmission angle in accordance with changes in the actual data communication environment of the vehicle, which is different from that of manufacture of the vehicle, even in case that the transmission angle setting is made only once at the time of sale and delivery of the vehicle. However, for example, if the transmission angle is set every time the vehicle travels with the ignition switch turned on, the transmission angle can be set according to changes in the data communication environment to meet changes in the data communication environment over time. For example, in the tire side device 1, the transmission angle can be set each time the vehicle travels by resetting the set transmission angle each time the vehicle is stopped for a certain period of time as indicated by the detection signal of the vibration sensor 10 and the control unit 11 remains in the sleep state.

Second Embodiment

A second embodiment is different from the first embodiment in that the transmission angle is made changeable. Other parts are similar to the first embodiment, and hence only the difference from the first embodiment will be described.

Figure 10:
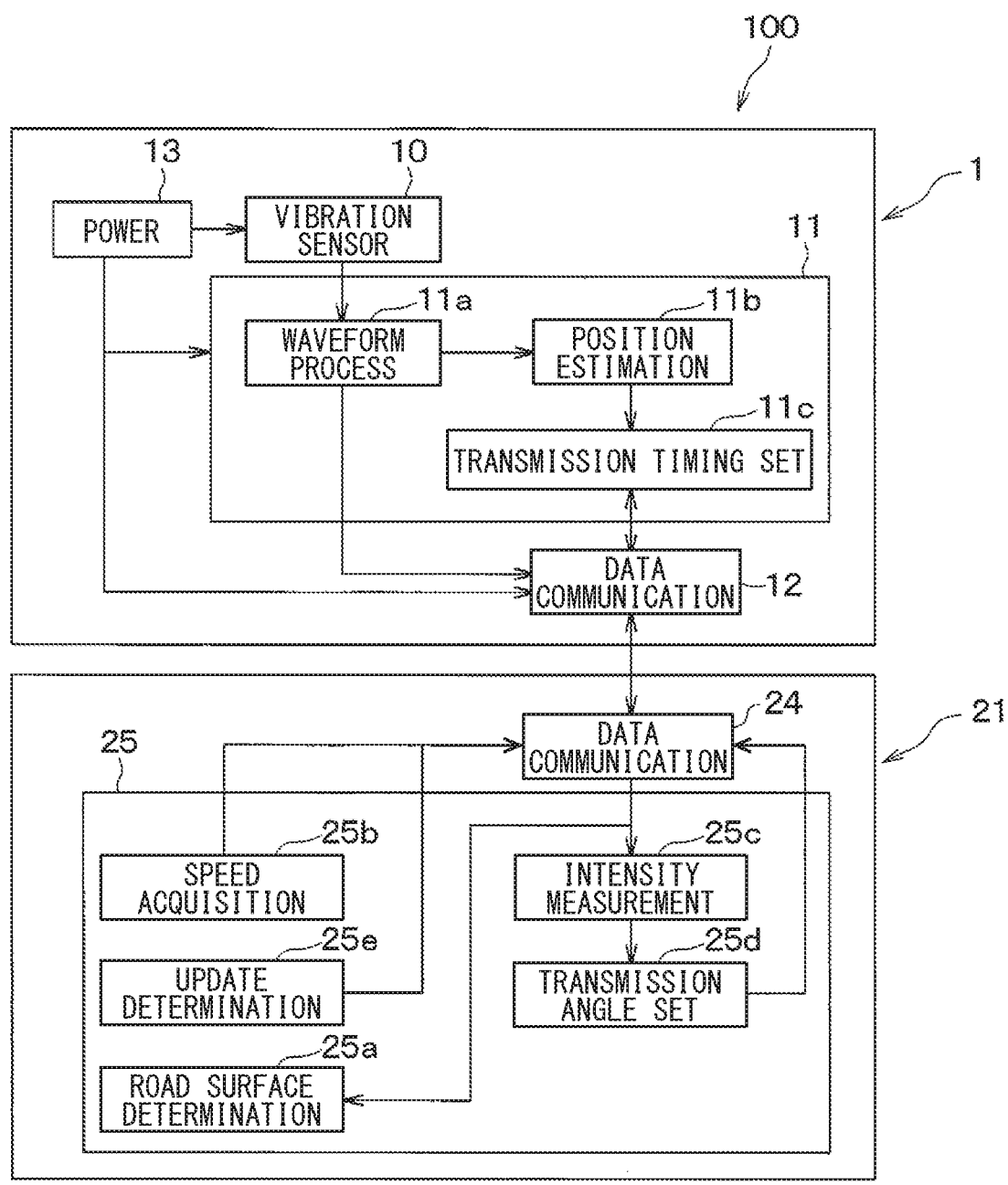
FIG. 10 is a block diagram showing respective details of each tire side device and a vehicle body side system provided in a tire system according to a second embodiment.

As shown in FIG. 10, in the present embodiment, an update determination unit 25e is added to the control unit 25 of the receiver 21. The update determination unit 25e is configured to update the transmission timing, that is, the transmission angle, of the road surface data from the tire side device 1. Specifically, the update determination unit 25e stores the reception strength (hereinafter, referred to as a maximum reception strength) when the reception strength of the measurement data becomes maximum during one rotation of the tire 3 when the transmission angle is set. The update determination unit 25e causes the reception strength measurement unit 25c to measure the reception strength when the road surface data is received from the tire side device 1, and updates the transmission angle when the measured reception strength is lower than the maximum reception strength. For example, the update determination unit 25e updates the transmission angle, when it is determined that the measured reception strength is lower than the maximum reception strength by a predetermined value, or when the measured reception strength is lowered by a predetermined ratio relative to the maximum reception strength. By updating the transmission angle in this way, it is possible to set a more appropriate transmission angle even when the environment changes after the transmission angle has been once set.

Figure 11:
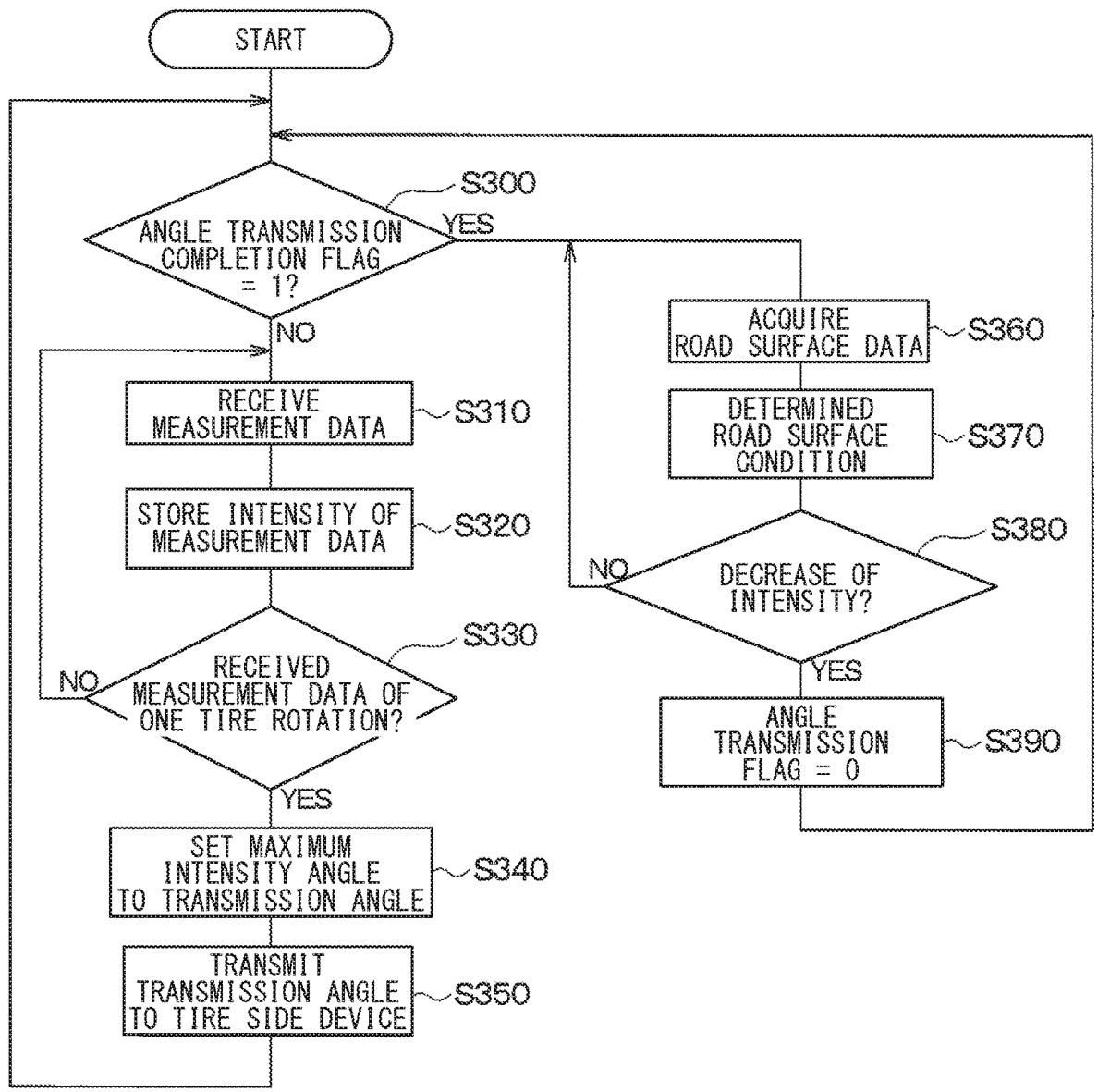
FIG. 11 is a flowchart showing details of vehicle body side processing according to the second embodiment.

Specifically, in case of the present embodiment, the control unit 25 updates the transmission angle by executing vehicle body side processing shown in FIG. 11. In each tire side device 1, the control unit 11 executes the tire side processing shown in FIG. 8 as in the first embodiment. As a result, the measurement data is transmitted before the transmission angle is set, and the road surface data is transmitted after the transmission angle is set.

First, in step S300, the control unit 25 checks whether the transmission angle data has been transmitted from the transmission angle setting unit 25d. Here, if the transmission completion flag (not shown) provided in the transmission angle setting unit 25d is set to "1," the control unit 25 determines that the data regarding the transmission angle has been transmitted. Here, if the transmission angle data has not been transmitted, the transmission angle is set and the transmission angle data is transmitted in steps S310 to S350 by performing the same processing as steps S110 to S150 of FIG. 6. In addition, in step S340, the control unit 25 stores the reception strength at the time when the reception strength became the maximum during one rotation of the tire 3 as the maximum reception strength.

Further, if the transmission angle data is transmitted, the control unit 25 receives in step S360 the road surface data, and measures the reception strength by the reception strength measurement unit 25c. Then, in step S370, the control unit 25 determines the road surface condition by the determination unit 25a based on the received road surface data in the similar manner as in step S170.

In step S380, the reception strength measured in step S360 is compared with the maximum reception strength to check whether the reception strength has decreased. If it has not decreased, step S370 is repeated. If it has decreased, the control unit 25 resets in step S390 the transmission completion flag of the transmission angle to "0" so that the processing from step S300 is executed again. Further, the control unit 25 transmits, via the data communication unit 24, a command signal for commanding the tire side device 1, the reception strength of which is determined lowered, to reset the transmission angle.

As a result, in the tire side device 1 for which it has been determined that the reception strength has decreased, it is determined in step S220 in FIG. 8 that the transmission angle has not been received from the vehicle body side system 2, and the measurement data is transmitted in step S230. Therefore, the control unit 25 executes the various processing of steps S300 to S350 and sets the transmission angle again to update the transmission angle.

In addition, when the transmission angle is updated, the control unit 25 stores in step S340 the reception strength at the time when the reception strength became the maximum during one rotation of the tire 3 as the maximum reception strength. For this reason, even after the transmission angle is updated, the transmission angle is updated again if the reception strength of the road surface data decreases. Thus, the transmission angle is updated to a more preferable one.

As described above, in the present embodiment, even after the transmission angle has been set, the transmission angle is updated when the reception strength of the road surface data decreases. As a result, it is possible to update the transmission angle to a more preferable transmission angle. Even if the data communication environment changes, the road surface data can be transmitted from the tire side device 1 to the vehicle body side system 2 even better.

Third Embodiment

A third embodiment is different from the first embodiment in that the tire side device 1 is configured to perform the vehicle speed estimation thereby to remove the vehicle speed data acquisition unit 25b from the vehicle body side system 2. Other configurations are the same as in the first embodiment. Therefore, only parts different from the first embodiment will be described.

Figure 12:
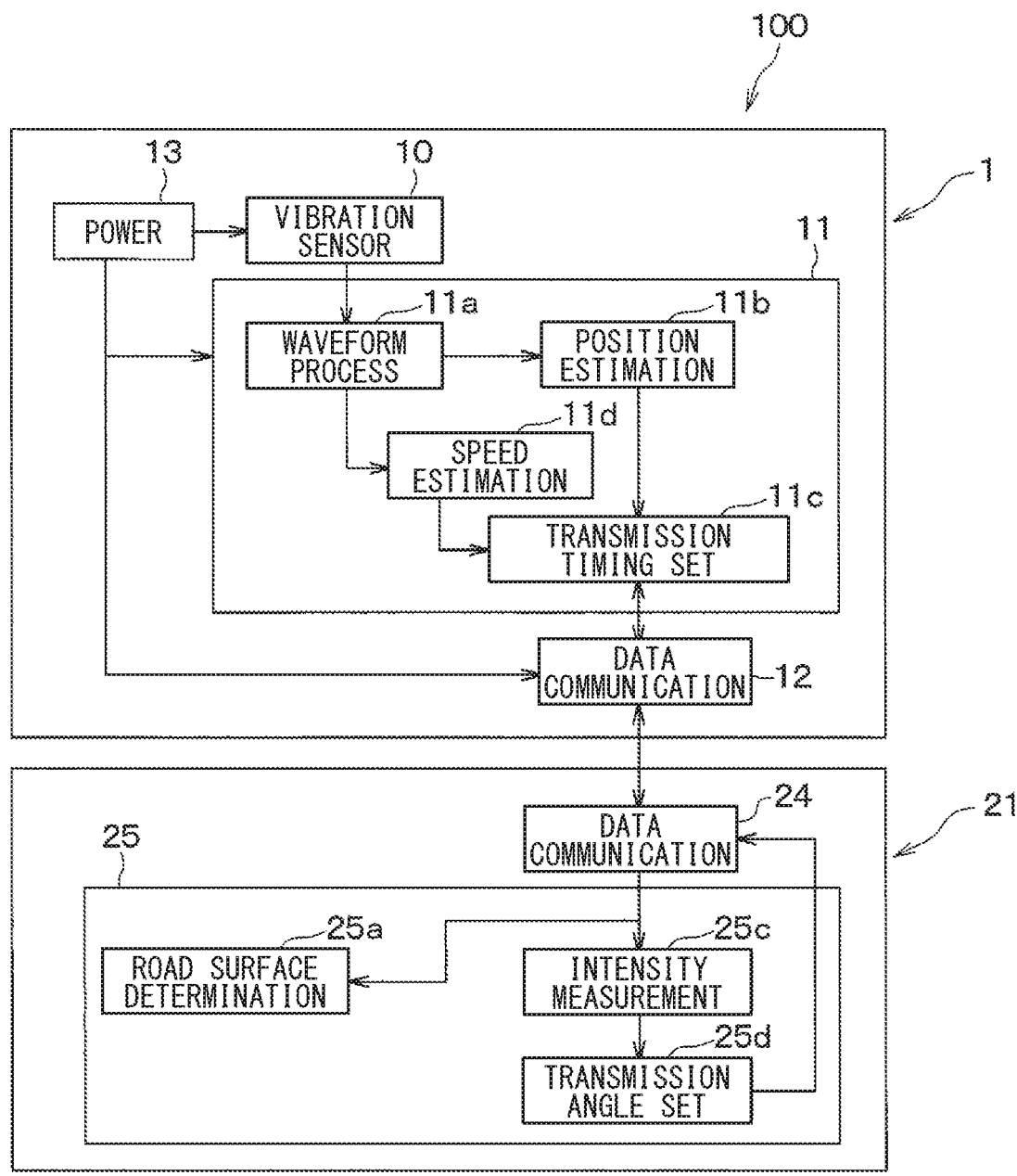
FIG. 12 is a block diagram showing respective details of each tire side device and a vehicle body side system provided in a tire system according to a third embodiment.

As shown in FIG. 12, in the present embodiment, the control unit 11 of the tire side device 1 includes a vehicle speed estimation unit 11d, and the control unit 25 of the receiver 21 does not include the vehicle speed data acquisition unit 25b.

The vehicle speed estimation unit 11d receives the detection signal of the vibration sensor unit 10 after waveform processing, for example, raw waveform data, from the waveform processing unit 11a, and estimates the vehicle speed based on the detection signal. Specifically, the vehicle speed estimation unit 11d stores a length of a circumference of the tire 3 to which the tire side device 1 is attached, and estimates the vehicle speed based on the stored length of the circumference and the raw waveform data. The detection signal of the vibration sensor unit 10 has the time-axis waveform as shown in FIG. 4, and a time interval between consecutive first peak values or between consecutive second peak values corresponds to the time required for the tire 3 to make one rotation. Therefore, the vehicle speed estimation unit 11d can estimate the vehicle speed from the length of the circumference of the tire 3 and the time required for the tire 3 to make one rotation, which is acquired from the waveform of the past detection signal.

Since the vehicle speed estimation unit 11d can estimate the vehicle speed in this way, the position estimation unit 11b can estimate the existence angle based on the vehicle speed estimated by the vehicle speed estimation unit 11d.

Figure 13:
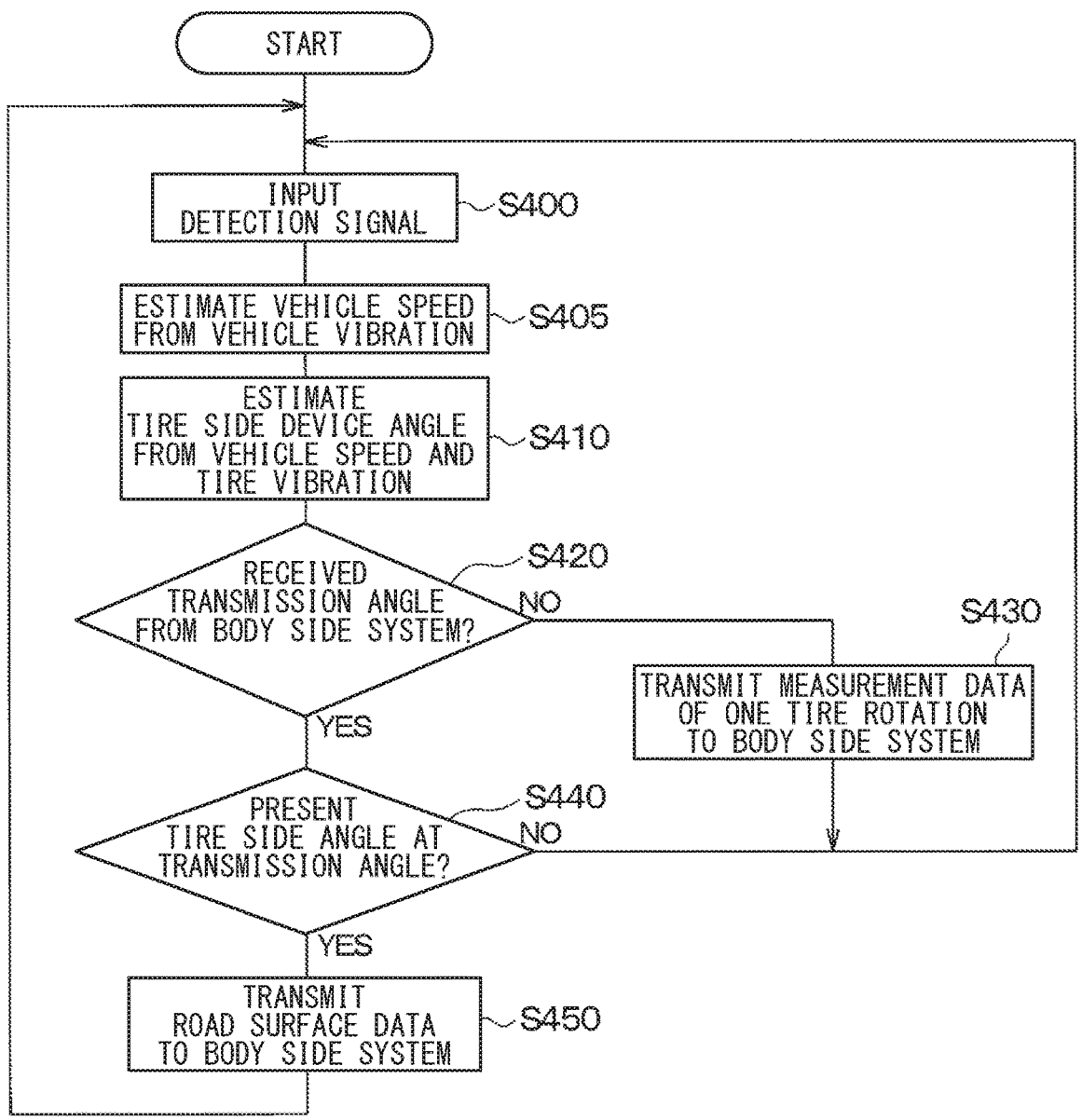
FIG. 13 is a flowchart showing details of tire side processing according to the third embodiment.

In the tire system 100 of the present embodiment configured in this way, the control unit 11 of the tire side device 1 executes tire side processing shown in FIG. 13. As for the vehicle body side system 2, the control unit 25 executes the vehicle body side processing shown in FIG. 6 to transmit the transmission angle and determine the road surface condition based on the road surface data, as in the first embodiment.

First, in step S400, similarly to step S200 in FIG. 8, the control unit 11 inputs the detection signal of the vibration sensor unit 10 and generates the detection signal to generate the raw waveform data and the road surface data. Then, in step S405, the control unit 11 estimates the vehicle speed based on the detection signal of the vibration sensor unit 10 according to the above-described method. Then, in steps S410 to S450, the same processing as steps S210 to S250 in FIG. 8 is performed.

As described above, in the present embodiment, the vehicle speed is estimated by the tire side device 1. Thus the third embodiment also provides the same effect as the first embodiment.

Fourth Embodiment

A fourth embodiment is different from the first to third embodiments in that the transmission angle is set in accordance with the surrounding environment. Other parts are similar to the first to third embodiments, and hence only the difference from the first to third embodiments will be described. It is assumed in the third embodiment that the first embodiment is modified to be able to set the transmission angle in accordance with the surrounding environment. The second and third embodiment may be modified in the same manner.

Figure 14:
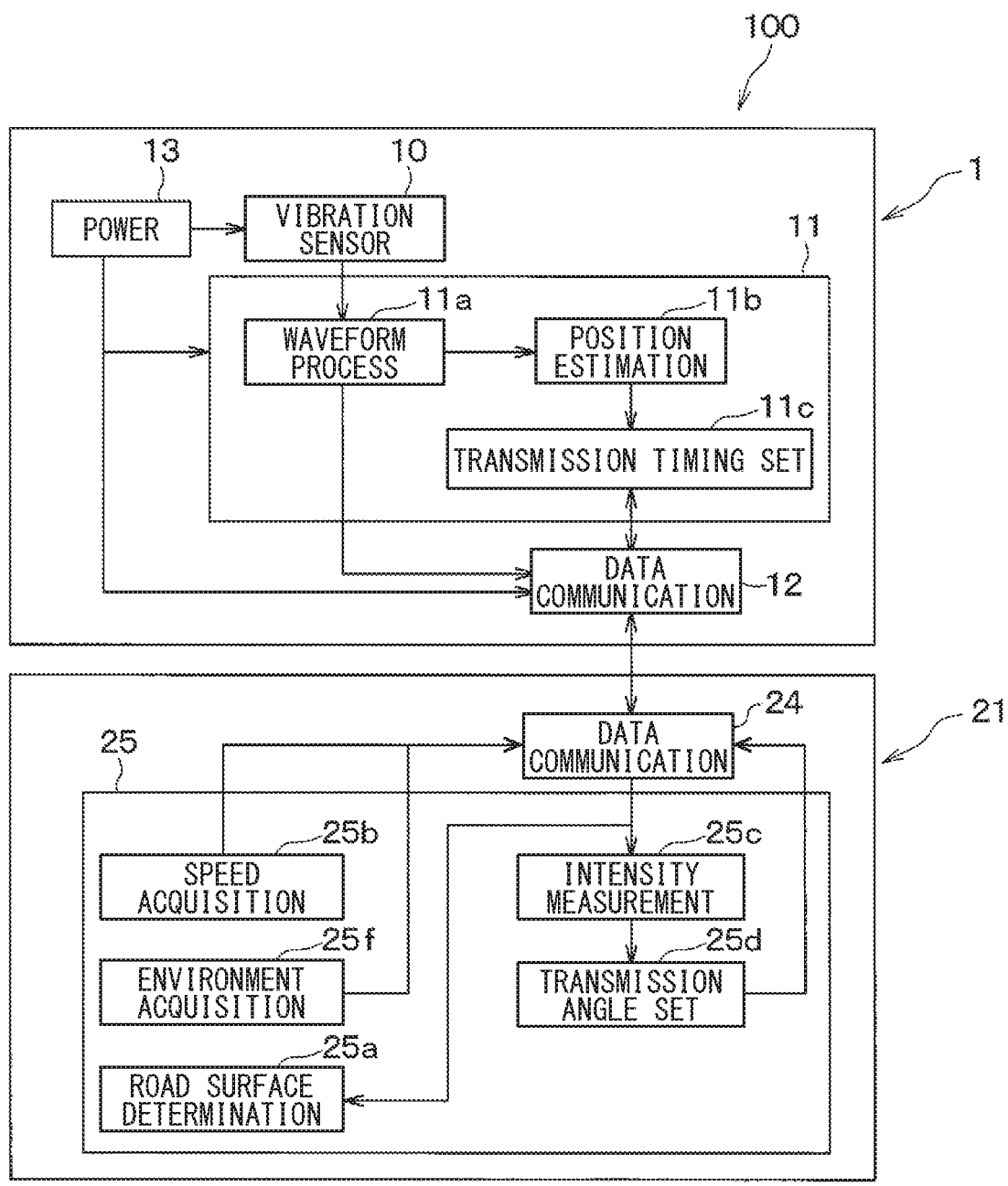
FIG. 14 is a block diagram showing respective details of each tire side device and a vehicle body side system provided in a tire system according to a fourth embodiment.

As shown in FIG. 14, in the present embodiment, a surrounding environment acquisition 25f is added to the control unit 25 of the receiver 21. The surrounding environment acquisition unit 25f acquires data regarding the surrounding environment of the vehicle. The surrounding environment acquisition unit 25f includes an in-vehicle camera, a millimeter wave radar, a sonar or the like to acquire data about the surrounding environment of the vehicle and detect obstacles such as buildings and surrounding vehicles, which may potentially cause some obstacle in setting the transmission angle. For example, the surrounding environment acquisition unit 25f is configured to detect the presence of a potential obstacle when the distance from the vehicle to the potential obstacle is less than a predetermined distance. When the surrounding environment acquisition unit 25f detects the presence of an obstacle that may be present in the vicinity of the vehicle, the surrounding environment acquisition unit 25f prevents the measurement data from being transmitted from the tire side device 1 or prevents the control unit 25 from setting the transmission angle.

In case of the present embodiment, the surrounding environment acquisition unit 25f does not command the transmission of the measurement data from the vehicle body side system 2 to the tire side device 1 when the presence of a potential obstacle to the vehicle is detected, and commands the transmission of the measurement data when the potential obstacle is not detected. By doing so, the measurement data is not transmitted from the tire side device 1 when the presence of the potential obstacle is detected as being present around the vehicle.

Figure 15:
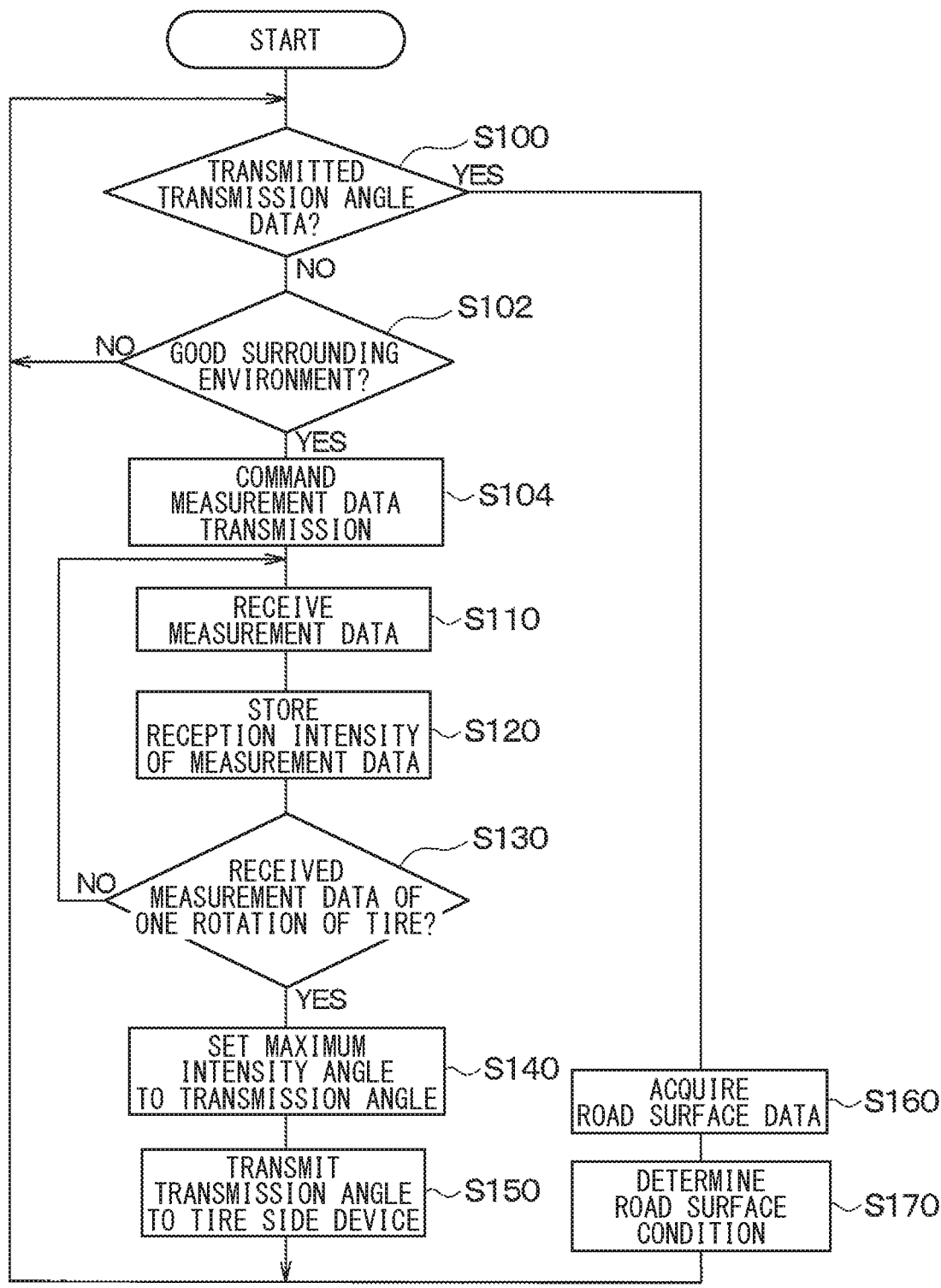
FIG. 15 is a flowchart showing details of vehicle body side processing according to the fourth embodiment.
Figure 16:
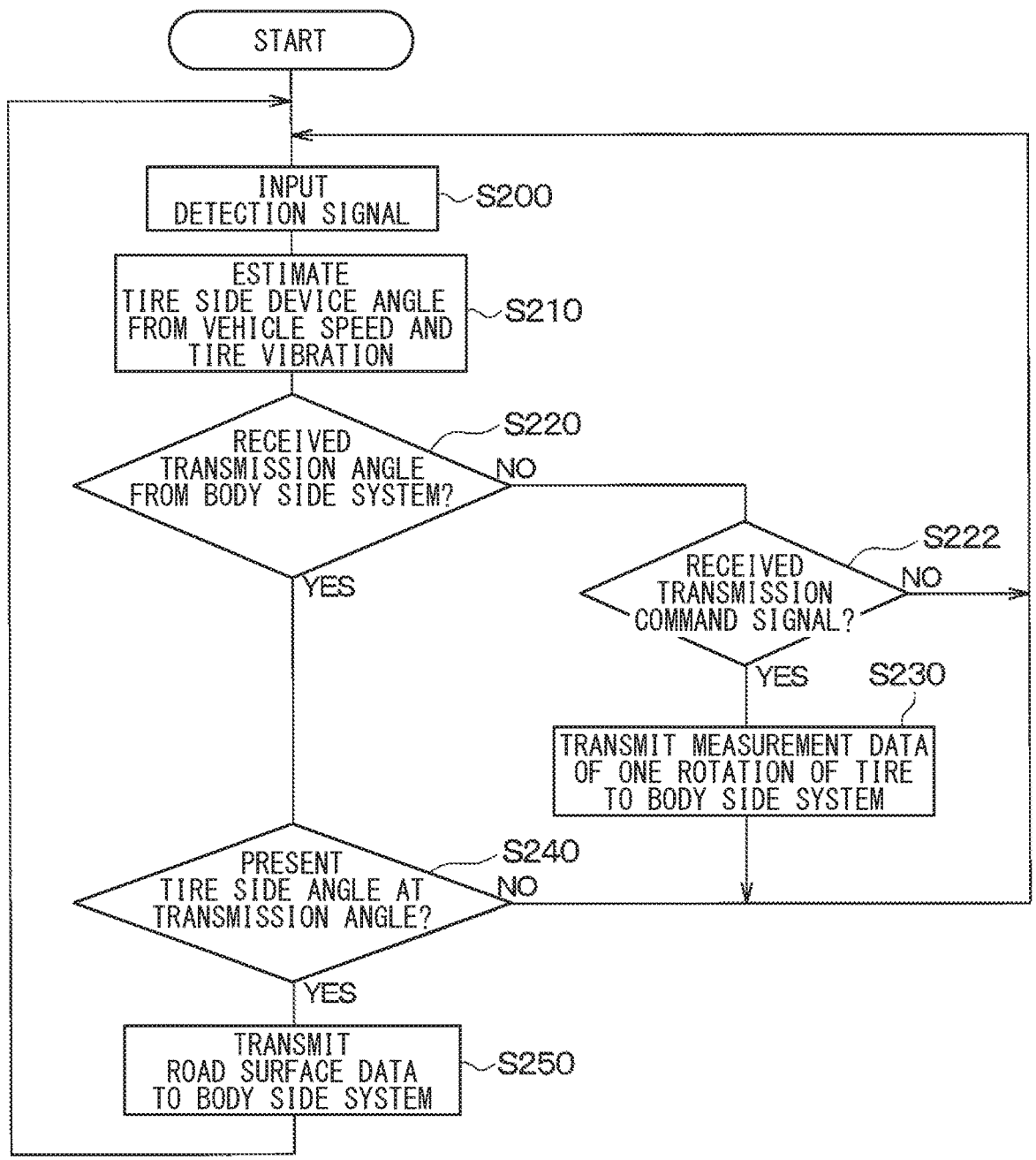
FIG. 16 is a flowchart showing details of tire side processing according to the fourth embodiment.

Specifically, in case of the present embodiment, the control unit 25 of the receiver 21 executes vehicle body side processing shown in FIG. 15, and the control unit 11 of the tire side device 1 executes tire side processing shown in FIG. 16.

First, as shown in FIG. 15, in step S100, the control unit 25 performs the same processing as in step S100 of FIG. 6, and then in step S102 checks whether the surrounding environment is good for communication. This determination is performed based on the detection result of the surrounding environment acquisition unit 25f. Then, when the surrounding environment acquisition unit 25f does not detect the presence of a potential obstacle in the surrounding area of the vehicle, the control unit 25 generates the measurement data transmission command. As a result, the transmission command signal for commanding the tire side device 1 to transmit the measurement data is output through the data communication unit 24. When the surrounding environment acquisition unit 25f detects the presence of the potential obstacle in the surrounding area of the vehicle, the control unit 25 repeats the processing from step S100 without proceeding to step S104. Therefore, in this case, the transmission command signal of the measurement data is not transmitted from the vehicle body side system 2 to each tire side device 1.

On the other hand, as shown in FIG. 16, the control unit 11 performs the same processing in steps S200 to S220 as in steps S200 to S220 described in reference to FIG. 8. When a negative determination is made in step S220, the control unit 11 checks in step S222 whether the transmission command signal has been received.

Here, if the transmission command signal is transmitted to each tire side device 1 based on the transmission command of the measurement data in step S104 of FIG. 15 described above, an affirmative determination is made in step S222 and the processing of step S230 is executed. As a result, since the measurement data including the existence angle data is transmitted to the vehicle body side system 2 through the data communication unit 12, the vehicle body side system 2 sets the transmission angle based on the measurement data. On the other hand, if the transmission command signal has not been transmitted to each tire side device 1, a negative determination is made in step S222, and the processing ends without execution of step S230. Therefore, it is possible to prevent the measurement data from being transmitted and prevent the setting of the transmission angle in the vehicle body side system 2.

It is noted that, as shown in steps S110 to S170 of FIG. 15, the control unit 25 performs the same operation as steps S110 to S170 of FIG. 6 after generating the transmission command signal of the measurement data. Further, with respect to the control unit 11, since the transmission angle data is sent from the vehicle body side system 2 after transmitting the measurement data, a positive determination is made in step S220 in FIG. 16. Therefore, thereafter, the control unit 11 performs the same operations as steps S240 and 250 of FIG. 8 in steps S240 and S250.

As described above, the surrounding environment acquisition unit 25f acquires data about the surrounding environment of the vehicle, and does not set the transmission angle when there is something that may cause an obstacle around the vehicle, That is, the transmission angle is not set in case that the influence of the multipath is likely to arise, and the transmission angle is set when the influence of the multipath is not likely to arise. As a result, it is possible to prevent an inappropriate transmission angle from being set, and it is possible to attain the same effect as that of the first embodiment.

Fifth Embodiment

A fifth embodiment is different from the first to fourth embodiments in that the transmission angle is set by each tire side device 1. Since other parts of the present embodiment are the same as those of the first to fourth embodiments, only the parts different from the first to fourth embodiments will be described.

Figure 17:
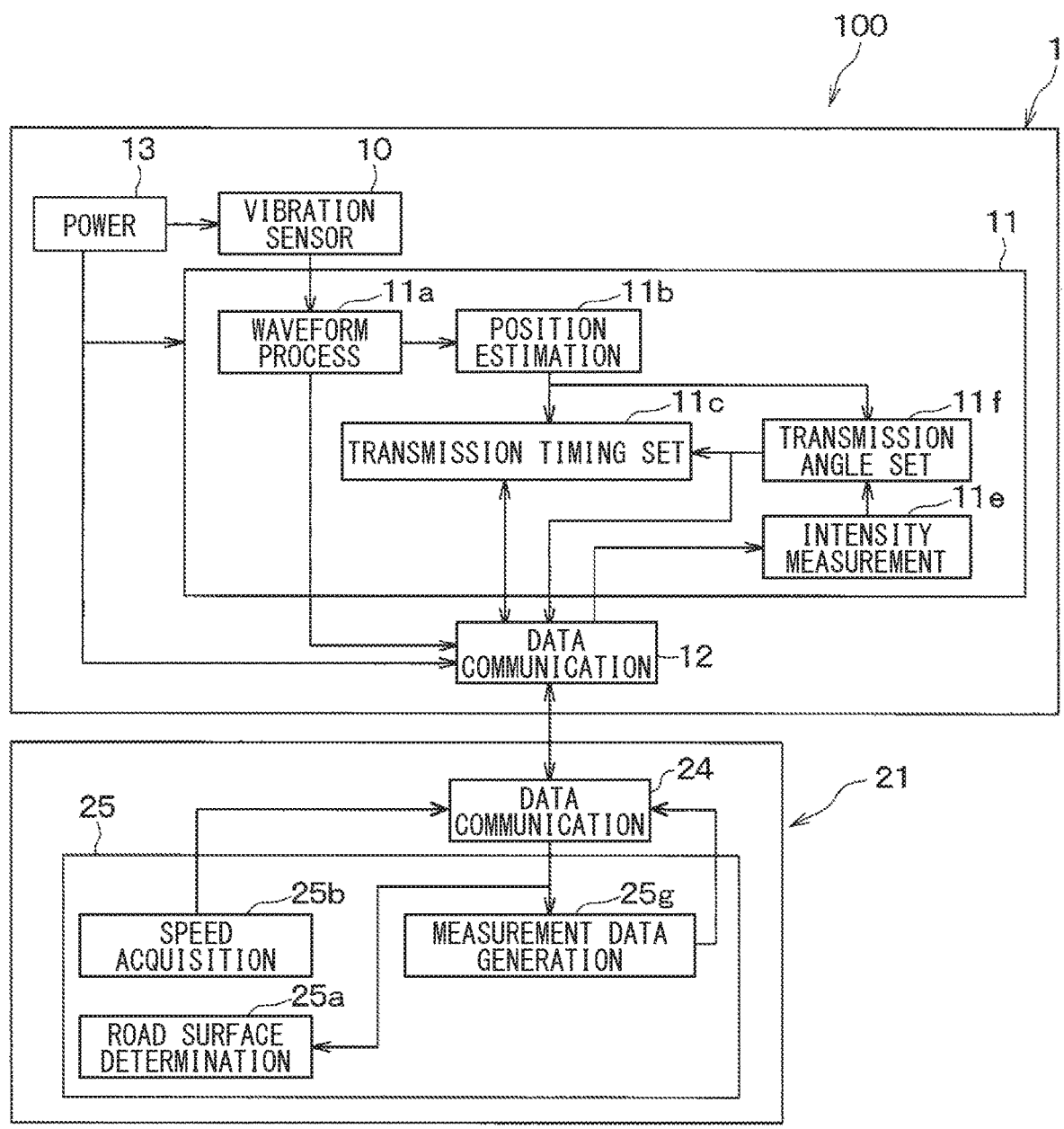
FIG. 17 is a block diagram showing respective details of each tire side device and a vehicle body side system provided in a tire system according to a fifth embodiment.

As shown in FIG. 17, in the present embodiment, the control unit 11 of the tire side device 1 is provided with a reception strength measuring unit 11e and a transmission angle setting unit 11f, and the control unit 25 of the receiver 21 is provided with a measurement data generation unit 25g, in addition to the configuration of the first embodiment. Further, in the present embodiment, the reception strength measurement unit 25c and the transmission angle setting unit 25d provided in the control unit 25 of the receiver 21 in the first embodiment are not provided.

The measurement data generation unit 25g generates measurement data to be transmitted to each tire side device 1. The measurement data may be any signal, for example dummy data, as long as it has a constant radio field strength. In case of the present embodiment, when the receiver 21 receives the measurement data transmission request from each tire side device 1, the measurement data generation unit 25g generates the measurement data, and transmits the generated measurement data to the tire side device 1, which has transmitted the transmission request, through the data communication unit 24.

Upon receiving the measurement data transmitted from the vehicle body side system 2, the reception strength measuring unit 11e measures the reception strength. The reception strength measurement unit 11e continuously receives the measurement data, measures the reception strength, and transmits the measurement result to the transmission angle setting unit 11f.

The transmission angle setting unit 11f sets the transmission angle based on the reception strength transmitted from the reception strength measurement unit 11e and the existence angle data for each sampling cycle included in the measurement data. Specifically, the transmission angle setting unit 11f stores the presence angle estimated by the position estimation unit 11b and the reception strength measured by the reception strength measurement unit 11e in association with each other, and extract the existence angle at which the reception strength is the highest in one rotation of the tire. Then, the transmission angle setting unit 11f sets the existence angle when the reception strength is the highest as the transmission angle. Further, the transmission angle setting unit 11f notifies the transmission timing generation unit 11c of data regarding the set transmission angle. Thus, the transmission timing generation unit 11c detects that the existence angle has become the transmission angle.

When the transmission angle is set, the transmission angle setting unit 11f outputs a notification signal indicating a completion of the transmission angle setting, and transmits the notification signal to the vehicle body side system 2 via the data communication unit 12. This notification signal is received by the receiver 21, and the generation of the measurement data by the measurement data generation unit 25g is stopped.

The transmission angle setting unit 11f resets the set transmission angle and determines that the transmission angle has not been set, for example, when the vehicle stops and the control unit 11 enters the sleep state. Then, when it is determined that the transmission angle has not been set, the transmission angle setting unit 11f issues a measurement data transmission request to the vehicle body side system 2 via the data communication unit 12.

Figure 18:
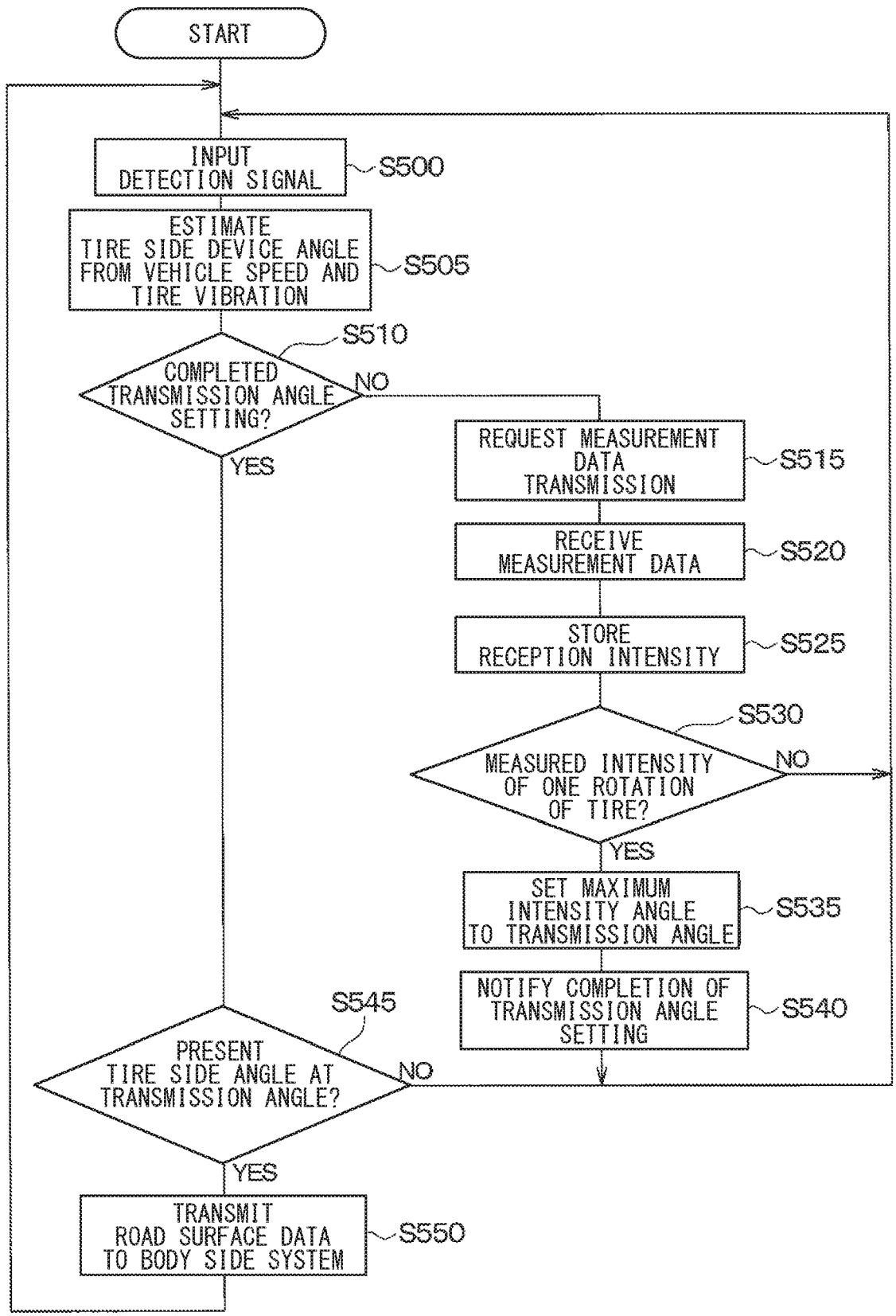
FIG. 18 is a flowchart showing details of tire side processing according to the fifth embodiment.
Figure 19:
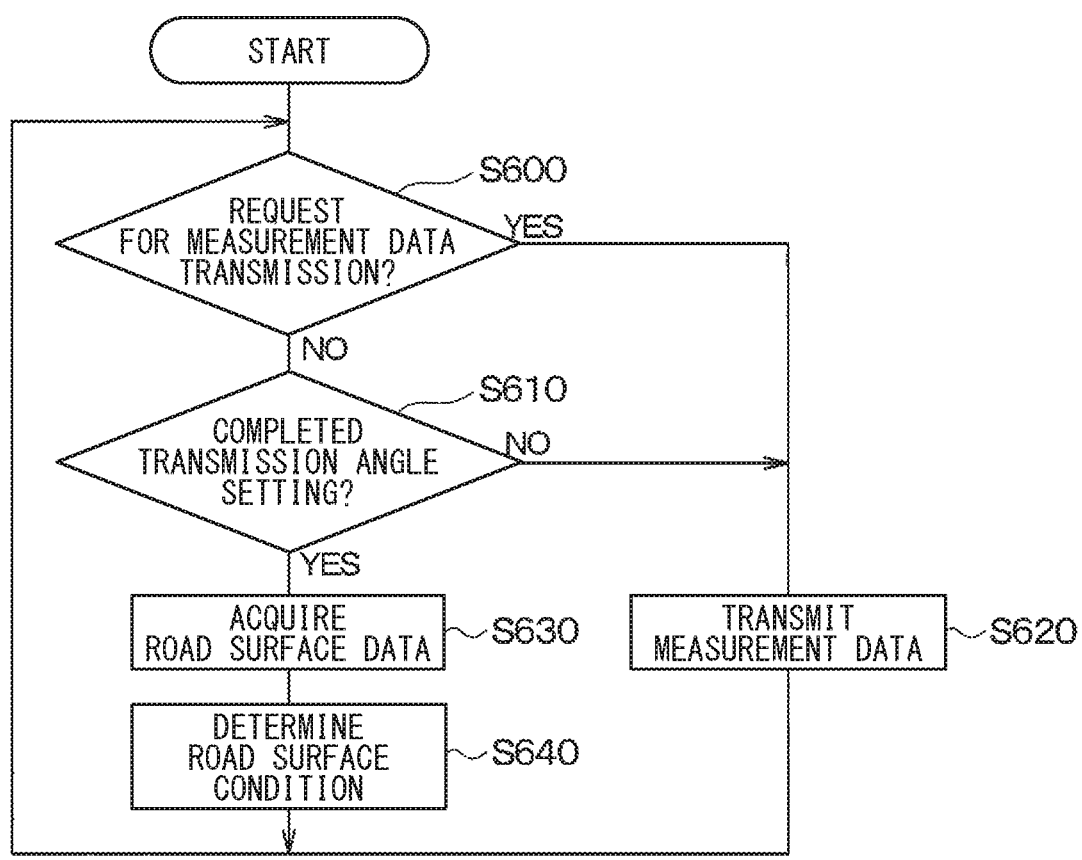
FIG. 19 is a flowchart showing details of vehicle body side processing according to the fifth embodiment.

Specifically, in case of the present embodiment, the control unit 11 executes the tire side processing shown in FIG. 18 in each tire side device 1, and the control unit 25 performs the vehicle body side processing shown in FIG. 19 in the vehicle body side system.

First, as shown in FIG. 18, the control unit 11 inputs the detection signal of the vibration sensor unit 10 and generates the raw waveform data and the road surface data by using the detection signal in step S500 in the similar manner as in step S200 of FIG. 8. Further, in step S505, the control unit 11 estimates the existence angle in the same manner as in step S210. Then, the control unit 11 checks in step S510 whether the setting of the transmission angle has been completed. Here, when the vehicle has just started to travel, such as immediately after the start switch of the vehicle has been turned on, the transmission angle has not been set yet by the transmission angle setting unit 11f. As a result, a negative determination is made in S510 and the processing proceeds to step S515. Thus, the control unit 11 issues the measurement data transmission request.

On the other hand, as shown in FIG. 19, the control unit 25 checks in step S600 whether there is a transmission request for the measurement data. Based on the processing in step S515 of FIG. 18 described above, the control unit 25 causes the data communication unit 24 to transmit the measurement data in step S610 when the transmission request for the measurement data has been issued.

In the tire side device 1, the control unit 11 receives the measurement data in step S520 after executing the processing of step S515. Then, in step S525, the control unit 11 measures the reception strength of the measurement data, and stores it in association with the existence angle data estimated in step S505. Then in step S530, the control unit 11 checks whether the measurement data for one rotation of the tire has been received based on the existence angle estimated in step S505, and repeats the above processing until the measurement data of one rotation of the tire 3 is received. As a result, the control unit 25 stores the reception strength of the measurement data for each existence angle for one rotation of the tire 3.

Then, when the measurement data for one rotation of the tire 3 is received, the control unit 11 sets in step S535 the existence angle at which the reception strength of the measurement data received for one rotation of the tire 3 is maximum as the transmission angle. Further, in step S540, the control unit 11 causes the data communication unit 12 to transmit the notification signal indicating the completion of the transmission angle has been set to the vehicle body side system 2.

After this, an affirmative determination is made in step S510. Then, in steps S545 and S550, the control unit 11 performs the same processing as steps S240 and S250 of FIG. 8 to transmit the road surface data when the existence angle becomes the transmission angle.

Further, in the vehicle body side system 2, when the notification signal indicating the completion of setting of the transmission angle, an affirmative determination is made in step S610 of FIG. 19. Then, in steps S630 and S640, the road surface condition is determined by executing the same processing as steps S160 and S170 of FIG. 6.

As described above, it is also possible to transmit the measurement data from the vehicle body side system 2 and set the transmission angle in the tire side device 1. Thus the fifth embodiment also provides the same effect as the first embodiment.

Other Embodiment

Although the present disclosure is made with reference to the embodiments described above, the present disclosure is not limited to such embodiments but may include various changes and modifications which are within equivalent ranges. In addition, various combinations and forms, and further, other combinations and forms including only one element, or more or less than these elements are also within the scope and the scope of the present disclosure.

(1) For example, in each of the above embodiments, the data including the existence angle data for each sampling cycle is used as the measurement data. However, the raw waveform data or the like may be used as the measurement data. In case the raw waveform data is used, the vehicle side system 2 may use the time-axis waveform of the detection signal indicated by the raw waveform data as data indicating the existence angle to estimate the existence angle in the vehicle body side system 2. Then, the existence angle at the time of the maximum reception strength may be transmitted to each tire side device as the transmission angle data.

(2) Further, the tire side device 1 may recognize the transmission angle based on the transmission timing of the signal from the vehicle body side system 2. For example, in the vehicle body side system 2, the timing at which the reception strength of the measurement data is maximized during one rotation of the tire may be stored, and the vehicle body side system 2 may transmit to the tire side device 1 a notification signal in the next rotation to indicate that the reception strength stored in the previous rotation time has become the maximum in the previous rotation. With this configuration, the tire side device 1 can recognize the existence angle when the notification signal indicating the timing at which the reception strength is maximized is received from the vehicle body side system 2 as the transmission angle.

It is noted that the existence angle can be recognized because the vehicle speed data acquisition unit 25b recognizes the vehicle speed and the rotation speed of the tire 3 and is determined based on the vehicle speed. Therefore, when the notification signal is transmitted from the vehicle body side system 2, the vehicle body side system 2 can recognize the existence angle regardless of whether the tire side device 1 transmits the measurement data.

(3) In each of the above embodiments, the vehicle speed data acquired by the vehicle speed data acquisition unit 25b is sent to the tire side device 1, and the existence angle is estimated based on the vehicle speed and the detection signal of the vibration sensor unit 10. However, the existence angle may be estimated based on the detection signal of the vibration sensor unit 10 without using the vehicle speed. For example, the time required for one rotation of the tire may be estimated from the time-axis waveform of the past detection signal, such as the detection signal of the vibration sensor unit 10 for the previous one rotation of the tire, and the existence angle may be estimated based on the elapsed time from the first peak value or the second peak value.

(4) Further, in each of the above embodiments, the existence angle at which the reception strength of the measurement data is the highest during one rotation of the tire 3 is set as the transmission angle, but the transmission angle need not necessarily correspond to the highest strength time. For example, a threshold may be set for the reception strength, and the existence angle at which the reception strength is higher than the threshold may be set as the transmission angle. When there are a plurality of existence angles that satisfy this condition, an arbitrary existence angle may be set as the transmission angle. However, it is preferable to set the transmission angle that has the highest reception strength among them.

(5) In the second embodiment, as an example of setting the transmission angle based on the command signal from the vehicle body side system 2, the transmission angle is set to correspond to the decrease of the reception strength of the road surface data relative to the maximum reception strength. However, a command signal may be transmitted from the vehicle body side system 2 to each tire side device 1 at an arbitrary timing, and each tire side device 1 may transmit the measurement data for setting the transmission angle in response to the command signal as a trigger.

(6) Further, in each of the above embodiments, the vibration sensor unit 10 is formed of the acceleration sensor. However, the vibration sensor unit 10 may alternatively be formed of the other element capable of detecting vibration such as, e.g., a piezoelectric element.

(7) Further, in the above embodiments, data including the characteristic value is used as the road surface data indicating the road surface condition appearing in the detection signal of the vibration sensor unit 10 from the tire side device 1. However, this is only one example, and other data may be used as the road surface data. For example, the integrated value data of the vibration waveform of each of the five regions R1 to R5 included in the vibration data of one rotation of the tire 3 may be used as the road surface data, or raw data of the detection signal itself may be used as the road surface data.

(8) In addition, in each of the above embodiments, the road surface determination unit 28a of the receiver 21 included in the vehicle body side system 2 determines the degree of similarity between the characteristic value and the support vector to determine the road surface condition. However, this is only one example. It is also possible that any sections in the vehicle body side system 2, e.g., other ECU such as the brake ECU 22 may be configured to determine the degree of similarity, determine the road surface condition and transmit the command signal. In addition, it is also possible to store the support vector in the tire side device 1 so that the tire side device 1 determines the road surface condition and transmit data indicating the determination result of the road surface condition to the vehicle body side system 2 as the road surface data.

(8) The control unit and the method described in the present disclosure may be implemented by a special purpose computer which is configured with a memory and a processor programmed to execute one or more particular functions embodied in computer programs of the memory. Alternatively, the control unit and the method described in the present disclosure may be implemented by a special purpose computer configured as a processor with one or more special purpose hardware logic circuits. Alternatively, the control unit and the method described in the present disclosure may be implemented by one or more special purpose computer, which is configured as a combination of a processor and a memory, which are programmed to perform one or more functions, and a processor which is configured with one or more hardware logic circuits. Computer programs for software processing may be stored, as instructions to be executed by a computer, in a tangible non-transitory computer-readable medium.

What is claimed is:

1. A road surface condition determination device comprising a tire side device attached to each tire of a vehicle, and a vehicle body side system provided in a vehicle body, wherein:

the tire side device includes a vibration detection unit configured to output a detection signal varying with a magnitude of vibration of the tire, a first control unit configured to generate road surface data indicating a road surface condition appearing in a waveform of the detection signal and measurement data for use in measuring a reception strength by the vehicle body side system, estimate an existence angle indicating a position of the tire sided device relative to a predetermined position of the tire based on the waveform of the detection signal, and cause a transmission of the road surface data at a transmission timing determined based on the existence angle, and a first data communication unit configured to transmitting the road surface data or the measurement data;

the vehicle body side system includes a second data communication unit configured to receive, by bilateral communication with the tire side device, the road surface data and the measurement data transmitted from the first data communication unit, and a second control unit configured to determine a road surface condition of a traveling road surface of the vehicle based on the road surface data, measure a reception strength of the measurement data, store a reception strength of the measurement data in one rotation of the tire, and set a transmission angle to the existence angle at which a reception strength of the measurement data is higher than a predetermined value in one rotation of the tire; and the first control unit is configured to transmit the road surface data from the first data communication unit when the existence angle becomes the transmission angle.

2. The road surface condition determination device according to claim 1, wherein:

the second control unit is configured to set the transmission angle to the existence angle at which the reception strength of the measurement data is highest in one rotation of the tire.

3. The road surface condition determination device according to claim 2, wherein:

the vehicle body side system is configured to transmit a command signal to the tire side device at an arbitrary timing; and the first control unit is configured to cause the measurement data to be transmitted by using the command signal as a trigger.

4. The road surface determination device according to claim 2, wherein:

the second control unit is configured to acquire vehicle speed data corresponding to a vehicle speed of the vehicle, and transmit the vehicle speed data to the tire side device through the second data communication unit; and the first control unit is configured to estimate the existence angle based on the vehicle speed data and the waveform of the detection signal.

5. The road surface determination device according to claim 2, wherein:

the first control unit is configured to estimate time required for the tire to make one rotation based on the waveform of the detection signal output in the past and estimating a vehicle speed from estimated time; and the first control unit is configured to estimate the existence angle based on an estimated vehicle speed and the waveform of the detection signal.

6. The road surface determination device according to claim 2, wherein:

the second control unit is configured to measure the reception strength at time of receiving the road surface data transmitted from the tire side device after setting of the transmission angle, command a resetting of the transmission angle to the tire side device which has transmitted the road surface data, a reception strength of which has decreased, to transmit the measurement data upon determination of a decrease of a measured reception strength, and update the transmission angle based on the reception strength of the measurement data.

7. The road surface condition determination device according to claim 2, wherein:

the second control unit is configured to acquire data related to a surrounding environment of the vehicle and stop setting of the transmission angle when an obstacle which adversely affect the setting of the transmission angle is detected in the surrounding environment.

8. The road surface condition determination device according to claim 1, wherein:

the first control unit is configured to include, in the measurement data, data of the existence angle when transmitting the measurement data; and the second control unit is configured to set the transmission angle to the existence angle at which the reception strength of the measurement data is highest in one rotation of the tire.

9. The road surface condition determination device according to claim 8, wherein:

the vehicle body side system is configured to transmit a command signal to the tire side device at an arbitrary timing; and the first control unit is configured to cause the measurement data to be transmitted by using the command signal as a trigger.

10. The road surface determination device according to claim 8, wherein:

the second control unit is configured to acquire vehicle speed data corresponding to a vehicle speed of the vehicle, and transmit the vehicle speed data to the tire side device through the second data communication unit; and the first control unit is configured to estimate the existence angle based on the vehicle speed data and the waveform of the detection signal.

11. The road surface determination device according to claim 8, wherein:

the first control unit is configured to estimate time required for the tire to make one rotation based on the waveform of the detection signal output in the past and estimating a vehicle speed from estimated time; and the first control unit is configured to estimate the existence angle based on an estimated vehicle speed and the waveform of the detection signal.

12. The road surface determination device according to claim 8, wherein:

the second control unit is configured to measure the reception strength at time of receiving the road surface data transmitted from the tire side device after setting of the transmission angle, command a resetting of the transmission angle to the tire side device which has transmitted the road surface data, a reception strength of which has decreased, to transmit the measurement data upon determination of a decrease of a measured reception strength, and update the transmission angle based on the reception strength of the measurement data.

13. The road surface condition determination device according to claim 8, wherein:

the second control unit is configured to acquire data related to a surrounding environment of the vehicle and stop setting of the transmission angle when an obstacle which adversely affect the setting of the transmission angle is detected in the surrounding environment.

14. The road surface condition determination device according to claim 1, wherein:

the vehicle body side system is configured to transmit a command signal to the tire side device at an arbitrary timing; and the first control unit is configured to cause the measurement data to be transmitted by using the command signal as a trigger.

15. The road surface determination device according to claim 1, wherein:

the second control unit is configured to acquire vehicle speed data corresponding to a vehicle speed of the vehicle, and transmit the vehicle speed data to the tire side device through the second data communication unit; and the first control unit is configured to estimate the existence angle based on the vehicle speed data and the waveform of the detection signal.

16. The road surface determination device according to claim 1, wherein:

the first control unit is configured to estimate time required for the tire to make one rotation based on the waveform of the detection signal output in the past and estimating a vehicle speed from estimated time; and the first control unit is configured to estimate the existence angle based on an estimated vehicle speed and the waveform of the detection signal.

17. The road surface determination device according to claim 1, wherein:

the second control unit is configured to measure the reception strength at time of receiving the road surface data transmitted from the tire side device after setting of the transmission angle, command a resetting of the transmission angle to the tire side device which has transmitted the road surface data, a reception strength of which has decreased, to transmit the measurement data upon determination of a decrease of a measured reception strength, and update the transmission angle based on the reception strength of the measurement data.

18. The road surface condition determination device according to claim 1, wherein:

the second control unit is configured to acquire data related to a surrounding environment of the vehicle and stop setting of the transmission angle when an obstacle which adversely affect the setting of the transmission angle is detected in the surrounding environment.

19. A road surface condition determination device comprising a tire side device attached to each tire of a vehicle, and a vehicle body side system provided in a vehicle body, wherein:

the tire side device includes a vibration detection unit configured to output a detection signal varying with a magnitude of vibration of the tire, a first control unit configured to generate road surface data indicating a road surface condition appearing in a waveform of the detection signal, estimate an existence angle at which the tire side device is positioned relative to a predetermined position of the tire based on the waveform of the detection signal, and cause a transmission of the road surface data at a transmission timing determined based on the existence angle, and a first data communication unit configured to transmit the road surface data;

the vehicle body side system includes a second data communication unit configured to receive, by bilateral communication with the tire side device, the road surface data transmitted from the first data communication unit, and a second control unit configured to determine a road surface condition of a traveling road surface of the vehicle based on the road surface data, generate measurement data for use in measuring a reception strength by the tire side device; and the first control unit is configured to measure a reception strength of the measurement data, store the reception strength of the measurement data in one rotation of the tire, set a transmission angle to the existence angle at which the reception strength of the measurement data in one rotation of the tire is higher than a predetermined value, and transmit the road surface data from the first data communication unit when the existence angle becomes the transmission angle.

* * * * *